United States Patent
Tomono et al.

(10) Patent No.: US 11,360,405 B2
(45) Date of Patent: Jun. 14, 2022

(54) ELECTROPHOTOGRAPHIC APPARATUS, PROCESS CARTRIDGE AND CARTRIDGE SET

(71) Applicant: CANON KABUSHIKI KAISHA, Tokyo (JP)

(72) Inventors: Hiroyuki Tomono, Shizuoka (JP); Yoshitaka Suzumura, Shizuoka (JP); Takuya Mizuguchi, Shizuoka (JP); Osamu Matsushita, Kanagawa (JP); Masahiro Kurachi, Shizuoka (JP); Kazuhiro Yamauchi, Shizuoka (JP); Issei Imamura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 17/071,535

(22) Filed: Oct. 15, 2020

(65) Prior Publication Data

US 2021/0116829 A1 Apr. 22, 2021

(30) Foreign Application Priority Data

Oct. 18, 2019 (JP) .............................. JP2019-191592

(51) Int. Cl.
*G03G 15/02* (2006.01)
*G03G 9/08* (2006.01)

(52) U.S. Cl.
CPC ....... *G03G 15/0233* (2013.01); *G03G 9/0823* (2013.01); *G03G 2215/00654* (2013.01); (Continued)

(58) Field of Classification Search
CPC ............. G03G 15/0233; G03G 9/0823; G03G 2215/00654; G03G 2215/021; G03G 2215/025; G03G 2215/0617
See application file for complete search history.

(56) References Cited

U.S. PATENT DOCUMENTS 6,697,587 B2 2/2004 Harada
6,864,030 B2 3/2005 Shirai et al.
(Continued)

FOREIGN PATENT DOCUMENTS

JP 2002003651 A 1/2002
JP 2003107781 A 4/2003
(Continued)

OTHER PUBLICATIONS

U.S. Appl. No. 17/065,258, filed Oct. 7, 2020, Kohei Makisumi.
(Continued)

*Primary Examiner* — Joseph S Wong
(74) *Attorney, Agent, or Firm* — Venable LLP

(57) ABSTRACT

An electrophotographic apparatus comprising an electrophotographic photosensitive member, a charging device and a developing device, wherein the charging device comprises a conductive member arranged to be capable of contacting the electrophotographic photosensitive member, the conductive layer at the outer surface of the conductive member comprises a matrix and a plurality of domains dispersed in the matrix, at least some of the domains are exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner comprising a toner particle and a silica fine particle, and a coverage ratio of the toner surface with the silica fine particles is from 62.0% by area to 100.0% by area as determined by X-ray photoelectron spectroscopy.

10 Claims, 3 Drawing Sheets

(52) U.S. Cl.
CPC . *G03G 2215/021* (2013.01); *G03G 2215/025* (2013.01); *G03G 2215/0617* (2013.01)

(56) References Cited

U.S. PATENT DOCUMENTS

| | | | |
|---|---|---|---|
| 7,799,398 B2 | 9/2010 | Nakamura et al. | |
| 8,298,670 B2 | 10/2012 | Muranaka et al. | |
| 8,449,975 B2 | 5/2013 | Hirakoso et al. | |
| 8,503,916 B2 | 8/2013 | Anan et al. | |
| 8,628,854 B2 | 1/2014 | Yamauchi et al. | |
| 8,660,472 B2 | 2/2014 | Kurachi et al. | |
| 8,668,987 B2 | 3/2014 | Yamauchi et al. | |
| 8,715,830 B2 | 5/2014 | Yamada et al. | |
| 8,771,818 B2 | 7/2014 | Nishioka et al. | |
| 8,852,743 B2 | 10/2014 | Kikuchi et al. | |
| 8,980,510 B2 | 3/2015 | Fujii et al. | |
| 9,023,465 B2 | 5/2015 | Yamada et al. | |
| 9,029,054 B2 | 5/2015 | Okuda et al. | |
| 9,063,505 B2 | 6/2015 | Sekiya et al. | |
| 9,069,267 B2 | 6/2015 | Kaku et al. | |
| 9,086,643 B2 | 7/2015 | Kikuchi et al. | |
| 9,128,403 B2 | 9/2015 | Yamauchi et al. | |
| 9,146,482 B2 | 9/2015 | Watanabe et al. | |
| 9,304,416 B2 | 4/2016 | Noguchi et al. | |
| 9,360,789 B1 | 6/2016 | Masu et al. | |
| 9,372,418 B2 | 6/2016 | Shida et al. | |
| 9,372,419 B2 | 6/2016 | Tsuji et al. | |
| 9,442,408 B2 | 9/2016 | Yamauchi et al. | |
| 9,442,451 B2 | 9/2016 | Yamauchi et al. | |
| 9,541,854 B2 | 1/2017 | Kikuchi et al. | |
| 9,547,250 B2 | 1/2017 | Kikuchi et al. | |
| 9,551,947 B2 | 1/2017 | Hiroko et al. | |
| 9,551,949 B2 | 1/2017 | Yamauchi et al. | |
| 9,556,359 B2 | 1/2017 | Suzumura et al. | |
| 9,581,931 B2 | 2/2017 | Yamada et al. | |
| 9,599,913 B2 | 3/2017 | Nishioka et al. | |
| 9,599,915 B2 | 3/2017 | Anezaki et al. | |
| 9,639,009 B2 | 5/2017 | Yamaguchi et al. | |
| 9,651,888 B2 | 5/2017 | Muranaka et al. | |
| 9,665,028 B2 | 5/2017 | Arimura et al. | |
| 9,665,029 B2 | 5/2017 | Hino et al. | |
| 9,740,133 B2 | 8/2017 | Yamauchi et al. | |
| 9,811,009 B2 | 11/2017 | Yamada et al. | |
| 9,811,021 B2 | 11/2017 | Muranaka et al. | |
| 9,851,646 B2 | 12/2017 | Tomono et al. | |
| 9,897,931 B2 | 2/2018 | Nishioka et al. | |
| 9,958,802 B2 | 5/2018 | Kikuchi et al. | |
| 9,964,874 B2 | 5/2018 | Suzumura et al. | |
| 9,964,881 B2 | 5/2018 | Ikejiri et al. | |
| 9,964,914 B2 | 5/2018 | Arimura et al. | |
| 9,977,353 B2 | 5/2018 | Nishioka et al. | |
| 10,018,927 B2 | 7/2018 | Yamada et al. | |
| 10,018,934 B2 | 7/2018 | Yamada et al. | |
| 10,108,129 B2 | 10/2018 | Yamaguchi et al. | |
| 10,280,148 B2 | 5/2019 | Nishioka et al. | |
| 10,416,588 B2 | 9/2019 | Masu et al. | |
| 10,488,777 B2 | 11/2019 | Terauchi et al. | |
| 10,649,350 B2 | 5/2020 | Yamaguchi et al. | |
| 10,678,154 B2 | 6/2020 | Takashima et al. | |
| 10,678,158 B2 | 6/2020 | Kikuchi et al. | |
| 2003/0049554 A1* | 3/2003 | Ohmura | G03G 9/0806 430/110.2 |
| 2012/0251171 A1 | 10/2012 | Muranaka et al. | |
| 2012/0308261 A1 | 12/2012 | Tsuru et al. | |
| 2013/0281276 A1 | 10/2013 | Watanabe et al. | |
| 2014/0072343 A1 | 3/2014 | Masu et al. | |
| 2014/0080691 A1 | 3/2014 | Kurachi et al. | |
| 2014/0287354 A1* | 9/2014 | Kawamura | G03G 9/08722 430/109.3 |
| 2015/0331346 A1 | 11/2015 | Yamauchi et al. | |
| 2017/0102633 A1* | 4/2017 | Yoshidome | G03G 21/18 |
| 2018/0039201 A1 | 2/2018 | Muranaka et al. | |
| 2018/0217551 A1 | 8/2018 | Arimura et al. | |
| 2020/0225593 A1 | 7/2020 | Yamaguchi et al. | |
| 2020/0310264 A1 | 10/2020 | Kurachi et al. | |
| 2020/0310265 A1 | 10/2020 | Nishioka et al. | |
| 2020/0310266 A1 | 10/2020 | Kikuchi et al. | |
| 2021/0026295 A1 | 1/2021 | Yamada et al. | |
| 2021/0033996 A1 | 2/2021 | Kikuchi et al. | |
| 2021/0116827 A1* | 4/2021 | Fukudome | G03G 15/0233 |
| 2021/0116828 A1* | 4/2021 | Umeda | G03G 9/09716 |
| 2021/0116860 A1* | 4/2021 | Suzumura | G03G 9/0819 |

FOREIGN PATENT DOCUMENTS

| | | |
|---|---|---|
| JP | 2003280246 A | 10/2003 |
| JP | 2005049630 A | 2/2005 |
| JP | 2012068623 A | 4/2012 |
| JP | 2017107169 A | 6/2017 |
| JP | 2017207680 A | 11/2017 |
| JP | 2017211648 A | 11/2017 |
| JP | 2018077385 A | 5/2018 |
| JP | 2019045578 A | 3/2019 |

OTHER PUBLICATIONS

U.S. Appl. No. 17/069,919, filed Oct. 14, 2020, Tsutomu Nishida.
U.S. Appl. No. 17/070,054, filed Oct. 14, 2020, Yuka Ishiduka.
U.S. Appl. No. 17/070,085, filed Oct. 14, 2020, Fumiyuki Hiyama.
U.S. Appl. No. 17/070,179, filed Oct. 14, 2020, Kaname Watariguchi.
U.S. Appl. No. 17/071,103, filed Oct. 15, 2020, Noriyoshi Umeda.
U.S. Appl. No. 17/071,109, filed Oct. 15, 2020, Shohei Kototani.
U.S. Appl. No. 17/071,227, filed Oct. 15, 2020, Kosuke Fukudome.
U.S. Appl. No. 17/071,246, filed Oct. 15, 2020, Tomohiro Unno.
U.S. Appl. No. 17/071,283, filed Oct. 15, 2020, Yoshitaka Suzumura.
U.S. Appl. No. 17/071,540, filed Oct. 15, 2020, Tsuneyoshi Tominaga.
U.S. Appl. No. 17/072,206, filed Oct. 16, 2020, Satoru Nishioka.

* cited by examiner

ELECTROPHOTOGRAPHIC APPARATUS, PROCESS CARTRIDGE AND CARTRIDGE SET

BACKGROUND OF THE INVENTION

Field of the Invention

The present disclosure relates to an electrophotographic apparatus, a process cartridge and a cartridge set.

Description of the Related Art

In recent years, electrophotographic image forming apparatuses (hereinafter simply referred to as electrophotographic apparatuses) such as copiers and printers have been diversified in purpose and environment of use, and have been required to ensure stable image quality even in repeated use for a long period of time.

In an electrophotographic apparatus, a conductive member is used in a charging device. A configuration having a conductive support and a conductive layer provided on the support is known as a conductive member.

The conductive member plays a role of transporting an electric charge from the conductive support to the surface of the conductive member and giving a charge to a contacting body by discharging. This conductive member needs to ensure uniform charging of an electrophotographic photosensitive member to obtain high-quality electrophotographic images.

Japanese Patent Application Publication No. 2002-003651 discloses a rubber composition with a sea-island structure including a polymer continuous phase composed of an ion conductive rubber material having a raw material rubber A as a main component, and a polymer particle phase composed of an electronically conductive rubber material prepared by blending conductive particles into a raw material rubber B to make the rubber material conductive, and also discloses a charging member having an elastic layer formed from the rubber composition.

Meanwhile, a toner is required to exhibit high flowability and charging performance through repeated use over a long period of time. Therefore, as described in Japanese Patent Application Publication No. 2003-107781, a large amount of silica particles is added in order to maintain high flowability and charging performance of the toner over a long durability period.

SUMMARY OF THE INVENTION

According to a study conducted by the present inventors, the charging member according to Japanese Patent Application Publication No. 2002-003651 has a uniform electric resistance, and electric characteristics thereof are not affected by changes in environment such as temperature and humidity and are stable over time.

However, it has been recognized that there is still room for improvement in speeding up recently developed image forming process and long-term repeated durability.

Specifically, there is room for improvement in terms of member contamination occurring when the charging member according to Japanese Patent Application Publication No. 2002-003651 is used for forming an electrophotographic image, and when silica fine particles are used in a large amount in a coating and long-term repeated use is realized, as in Japanese Patent Application Publication No. 2003-107781.

Specifically, silica fine particles used in a large amount may migrate from a toner and adhere to a charging member in a high-speed process and repeated use over a long period of time. Since the silica fine particles thus adhered to the outer surface of the charging member have a high resistance, they cap the discharge sites of the charging member and hinder the discharge from the charging member.

Therefore, in a high-speed electrophotographic image forming process, the charging member with silica fine particles adhered to the outer surface thereof cannot sufficiently eliminate minute potential unevenness formed on the surface of a photosensitive member until the charging step. As a result, for example, in a halftone image, density unevenness may occur due to uneven potential of the photosensitive member.

Therefore, the present disclosure is aimed at providing an electrophotographic apparatus that contributes to the formation of a high-quality electrophotographic image even when a toner having a high coverage ratio with silica fine particle is repeatedly used for a long period of time.

Another aspect of the present disclosure is to provide a process cartridge and a cartridge set that contribute to the formation of a high-quality electrophotographic image.

According to one aspect of the present disclosure, an electrophotographic apparatus comprising:

an electrophotographic photosensitive member;

a charging device for charging a surface of the electrophotographic photosensitive member; and a developing device for developing an electrostatic latent image formed on the surface of the electrophotographic photosensitive member with a toner to form a toner image on the surface of the electrophotographic photosensitive member, wherein the charging device comprises a conductive member arranged to be capable of contacting the electrophotographic photosensitive member, the conductive member comprises a support having a conductive outer surface, and a conductive layer provided on the outer surface of the support, the conductive layer comprises a matrix and a plurality of domains dispersed in the matrix, the matrix contains a first rubber, each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy is provided.

According to other aspect of the present disclosure, a process cartridge that is detachably attachable to a main body of an electrophotographic apparatus, the process cartridge comprising:

a charging device for charging a surface of an electrophotographic photosensitive member; and a developing device for developing an electrostatic latent image formed on the surface of the electrophotographic photosensitive member with a toner to form a toner image on the surface of the electrophotographic photosensitive member, wherein the charging device comprises a conductive member arranged to be capable of contacting the electrophotographic photosensitive member, the conductive member comprises a support having a conductive outer surface, and a conductive layer provided on the outer surface of the support, the conductive layer comprises a matrix and a plurality of domains dispersed in the matrix, the matrix contains a first rubber, each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy is provided.

According to other aspect of the present disclosure, a cartridge set that is detachably attachable to a main body of an electrophotographic apparatus and comprises a first cartridge and a second cartridge, wherein the first cartridge comprises a charging device for charging a surface of an electrophotographic photosensitive member, and a first frame for supporting the charging device, the second cartridge comprises a toner container that accommodates a toner for developing an electrostatic latent image formed on the surface of the electrophotographic photosensitive member to form a toner image on the surface of the electrophotographic photosensitive member, the charging device comprises a conductive member arranged to be capable of contacting the electrophotographic photosensitive member;

the conductive member comprises a support having a conductive outer surface, and a conductive layer provided on the outer surface of the support, the conductive layer comprises a matrix and a plurality of domains dispersed in the matrix, the matrix contains a first rubber;

each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy is provided.

According to the present disclosure, an electrophotographic apparatus, a process cartridge and a cartridge set that contribute to the formation of a high-quality electrophotographic image can be provided.

Further features of the present invention will become apparent from the following description of exemplary embodiments with reference to the attached drawings.

DESCRIPTION OF THE EMBODIMENTS

Figure 1:
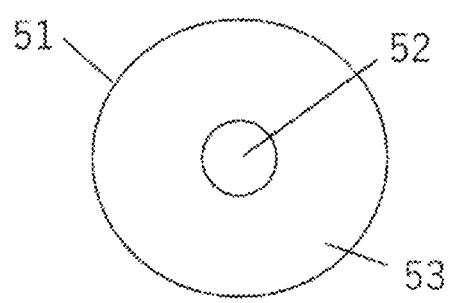
FIG. 1 is a cross-sectional view of a conductive roller in a direction orthogonal to the longitudinal direction.

In the present disclosure, the description "from XX to YY" or "XX to YY" representing a numerical range means a numerical range including a lower limit and an upper limit which are endpoints, unless otherwise specified.

Also, if the numerical ranges are listed in stages, the upper and lower limits of each numerical range can be combined as appropriate.

An electrophotographic apparatus according to one aspect of the present disclosure comprises:

an electrophotographic photosensitive member;

a charging device for charging a surface of the electrophotographic photosensitive member; and a developing device for developing an electrostatic latent image formed on the surface of the electrophotographic photosensitive member with a toner to form a toner image on the surface of the electrophotographic photosensitive member, wherein the charging device comprises a conductive member arranged to be capable of contacting the electrophotographic photosensitive member, the conductive member comprises a support having a conductive outer surface, and a conductive layer provided on the outer surface of the support, the conductive layer comprises a matrix and a plurality of domains dispersed in the matrix, the matrix contains a first rubber, each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy.

According to a study conducted by the present inventors, by using the electrophotographic apparatus as described above, excellent image density and uniformity of the image density of a halftone image are achieved even in a high-speed process and repeated use for a long period of time. The present inventors presume that this is due to the following causes.

When the electrophotographic apparatus is used repeatedly in a high-speed process for a long period of time, silica fine particles transferred from the toner adhere to the outer surface of the conductive member due to the above-described configuration. Here, the outer surface of the conductive member is a surface of the conductive member that contacts the toner.

Since silica fine particles tend to carry a negative charge, they will have a negative charge in the electrophotographic image forming process due to the discharge from the conductive member.

Normally, in a conductive member having a conductive layer, a conductive path capable of transporting electric charges is connected from the conductive support to the outer surface of the conductive member. Therefore, in one charging step, many charges in the conductive layer move to the outer surface side of the conductive member, and a discharge occurs. In this case, the amount of discharge in one discharge increases, and when silica fine particles receive the discharge, excessive negative charge is generated. Silica fine particles having an excessive negative charge tend to adhere to the outer surface of the conductive member. As a result, as described above, the image density of the halftone image and the uniformity of the density may be reduced.

The present inventors have found that by using a conductive member configured such that the amount of discharge per one discharge is suppressed and stable discharge can be performed at short intervals, it is possible to prevent silica fine particle from accumulating excessive negative charge in the electrophotographic image forming process.

Further, it is considered that silica fine particles are likely to adhere to the matrix having a high volume resistivity on the outer surface of the conductive member having the conductive layer provided with the domains and the matrix.

Meanwhile, the domain including the electronic conductive agent tends to have a low volume resistivity. When the electrophotographic photosensitive member is to be negatively charged, the outer surface of the conductive member holds a lot of negative charges. The outer surface of the conductive member is composed of at least a matrix and domains exposed at the outer surface of the conductive member, and at least some of the domains are exposed at the outer surface of the conductive member. Further, it is considered that since the volume resistivity R1 (unit: $\Omega \cdot cm$) of the matrix is $1.0 \times 10^5$ times or more the volume resistivity R2 (unit: $\Omega \cdot cm$) of the domains, a negative charge is concentrated on the domains. Since the silica fine particles tend to be negatively charged due to the physical properties of the material, electrostatic repulsion is generated between the silica fine particles and the domain where the negative charges are concentrated. As a result, the silica fine particles transferred from the toner adhere to the matrix.

Since the matrix has the volume resistivity R1 of larger than $1.00 \times 10^{12}$ $\Omega \cdot cm$, it is considered that even if the silica fine particles having no conductivity adhere, the charging characteristics are not significantly affected.

Further, since the coverage ratio of the silica fine particles on the surface of the toner is high, the exposure of the toner particle surface due to the embedding of the silica fine particles is suppressed even in a high-speed process and repeated use for a long period of time, and high flowability and charging performance can be maintained.

Due to the above, the conductive member can maintain the charge uniformity with respect to the electrophotographic photoconductive member, and the toner can also maintain high flowability and charging performance even in the high-speed process and repeated use for a long period of time. It is considered that this will result in excellent image density and image density uniformity of halftone images.

First, the conductive member as the charging member of the charging device will be described.

The present inventors investigated the reason why it is difficult to uniformly charge the surface of the electrophotographic photosensitive member when the silica fine particles migrate to the charging member according to Japanese Patent Application Publication No. 2002-003651.

In that process, the attention was focused on the role of a polymer particle phase made of an electronically conductive rubber material in the charging member according to Japanese Patent Application Publication No. 2002-003651. That is, it is considered that in an elastic layer (conductive layer), electron conductivity is imparted to the conductive layer by the transfer of electrons between polymer particle phases.

Also, the polymer continuous phase has ionic conductivity. It is considered that the silica fine particles that migrated to the charging member having such a sea-island structure randomly adhere to the polymer particle phase and the polymer continuous phase. As a result, the flow of electrons becomes uneven in the conductive layer, and the discharge from the outer surface of the charging member to the electrophotographic photosensitive member becomes uneven. It is considered that this makes the surface potential of the electrophotographic photosensitive member non-uniform.

Therefore, as a result of continuous studies, the present inventors have found that a conductive member and a toner satisfying the following requirements (A), (B) and (C) are effective in solving the problem.

Requirement (A):

The conductive member comprises a support having a conductive outer surface, and a conductive layer provided on the outer surface of the support; and the conductive layer comprises a matrix and a plurality of domains dispersed in the matrix. The matrix contains a first rubber, and each of the domains contains a second rubber and an electronic conductive agent.

At least some of the domains are exposed at the outer surface of the conductive member; and the outer surface of the conductive member is composed of at least the matrix and the domains exposed at the outer surface of the conductive member;

Requirement (B):

The matrix has the volume resistivity R1 of larger than $1.00 \times 10^{12}$ $\Omega \cdot cm$; and the volume resistivity R1 of the matrix is $1.0 \times 10^5$ times or more a volume resistivity R2 of the domains.

Requirement (C):

The toner accommodated in the developing device comprises a toner particle containing a binder resin, and a silica fine particle on a surface of the toner particle; and a coverage ratio of the toner surface with the silica fine particles is from 62.0% by area to 100.0% by area as determined by X-ray photoelectron spectroscopy (ESCA).

The conductive member will be described with reference to FIG. 1 using a roller-shaped conductive member (hereinafter also referred to as a conductive roller) as an example. FIG. 1 is a cross-sectional view in a direction orthogonal to the longitudinal direction, which is the axial direction of the conductive roller. A conductive roller 51 has a columnar shape and includes a support 52 having a conductive outer surface, and a conductive layer 53 provided on the outer periphery of the support 52, that is, on the outer surface of the support.

The material constituting the support having the conductive outer surface may be selected, as appropriate, from materials known in the field of conductive members for electrophotography and materials that can be used as conductive members. Examples thereof include synthetic resin having conductivity and metals and alloys such as aluminum, stainless steel, iron, copper alloy, and the like.

Furthermore, these may be subjected to oxidation or plating with chromium, nickel, or the like. Either electroplating or electroless plating can be used as the type of plating. From the viewpoint of dimensional stability, electroless plating is preferable. Examples of the electroless plating used here include nickel plating, copper plating, gold plating, and various types of alloy plating.

The thickness of the plated layer is preferably 0.05 μm or more, and considering the balance between work efficiency and rust prevention ability, the thickness of the plated layer is preferably from 0.10 μm to 30.00 μm. The cylindrical shape of the support may be a solid cylindrical shape or a hollow cylindrical shape (round tubular shape). The outer diameter of this support is preferably in the range of from 3 mm to 10 mm.

Where a medium-resistance layer or an insulating layer is present between the support and the conductive layer, it may not be possible to quickly supply the charge after the charge has been consumed by the discharge. Therefore, the conductive layer may be provided directly on the support, or the conductive layer may be provided on the outer periphery of the support only with an intermediate layer composed of a thin film and a conductive resin layer such as a primer interposed therebetween.

As the primer, known materials can be selected and used according to the rubber material for forming the conductive layer and the material of the support. The material of the primer can be exemplified by a thermosetting resin and a thermoplastic resin. Specifically, known materials such as phenolic resins, urethane resins, acrylic resins, polyester resins, polyether resins, and epoxy resins can be used.

Figure 2:
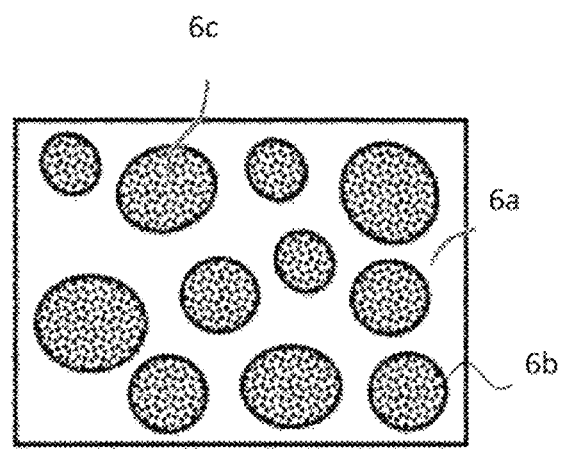
FIG. 2 is a partial cross-sectional view of a conductive layer.

FIG. 2 shows an example of a partial cross-sectional view of the conductive layer in a direction orthogonal to the longitudinal direction of the conductive roller.

The conductive layer has a matrix-domain structure having a matrix 6a containing a first rubber and domains 6b containing a second rubber and an electronic conductive agent. As shown in the figure, the domain 6b includes an electronic conductive agent 6c.

It is considered that in a conductive layer, when a bias is applied between a support of a conductive member having a conductive layer satisfying the above requirements (A) and (B) and an electrophotographic photosensitive member, the electric charges move in the following manner from the support side of the conductive layer to the outer surface side of the conductive member which is the opposite side.

First, the electric charges are accumulated near the interfaces between the matrix and the domains. Then, the charges are sequentially transferred from the domains located on the support side to the domains located on the side opposite to the support side, and reach the surface on the side of the conductive layer opposite to the support side (hereinafter also referred to as the outer surface of the conductive layer). At this time, where the charges of all the domains move to the outer surface side of the conductive layer in one charging step, it takes time to accumulate the electric charges in the conductive layer for the next charging step. Thus, it becomes difficult to adapt to a high-speed electrophotographic image forming process. Therefore, it is preferable that transfer of charges between the domains does not occur simultaneously even when a charging bias is applied. In addition, in a high-speed electrophotographic image forming process, since the movement of charges is restricted, it is preferable that a sufficient amount of electric charges be accumulated in each domain in order to discharge a sufficient amount of charges in one discharge. With the conductive member provided with a conductive layer satisfying the above requirements (A) and (B), simultaneous transfer of charges between the domains when a charging bias is applied is restricted, and sufficient amount of charges can be accumulated in the domains.

As described above, by making the volume resistivity R1 of the matrix larger than $1.00 \times 10^{12}$ Ω·cm, it is possible to prevent the electric charges from bypassing the domains and moving in the matrix. Thus, it is possible to suppress the consumption of most of the accumulated charges by one discharge. In addition, it is possible to prevent the occurrence of a state where conductive paths are formed, as if communicating inside the conductive layer, by the leakage of electric charges accumulated in the domains to the matrix.

The volume resistivity R1 is preferably $1.0 \times 10^{14}$ Ω·cm or more, and more preferably $1.0 \times 10^{16}$ Ω·cm or more. Meanwhile, the upper limit of R1 is not particularly limited, but as a guide, it is preferably $1.0 \times 10^{17}$ Ω·cm or less.

The present inventors believe that an effective means for moving the electric charges through the domains in the conductive layer and achieving a fine discharge in a high-speed electrophotographic image forming process is to separate regions (domains) in which the electric charges have been sufficiently accumulated by an electrically insulating region (matrix). By setting the volume resistivity of the matrix within the range of a high-resistance region as described above, it is possible to retain sufficient amount of electric charges at the interface between the matrix and the domains, and it is possible to suppress charge leakage from the domains.

It was also found that it is effective to limit a charge transfer path to a path through the domains interposed in order to achieve a minute discharge and a necessary and sufficient discharge amount. By suppressing the leakage of electric charges from the domains to the matrix and limiting the charge transfer path to a path through the plurality of domains, it is possible to increase the density of the charges present in the domains. As a result, the charging amount of electric charges in each domain can be further increased.

With this, it is possible to increase the total number of electric charges that can participate in the discharge on the surface of the domains as a conductive phase that is the starting point of the discharge. It is considered that as a result, the discharge from the surface of the conductive member can be facilitated.

Further, the discharge generated from the outer surface of the conductive layer is inclusive of an effect in which electric charges are extracted by an electric field from the domains as the conductive phase, and also and simultaneously a γ effect in which positive ions generated by the ionization of air by the electric field collide with the surface of the conductive layer where negative electric charges are present, and release the electric charges from the surface of the conductive layer. As described above, electric charges can be caused to be present at a high density in the domains as a conductive phase on the surface of the conductive member. It is therefore supposed that the efficiency of generation of discharge charges when positive ions are caused by the electric field to collide with the surface of the conductive layer can be increased, and a state can be assumed in which more discharge charges can be generated easier than with the conventional conductive members.

Moreover, it is assumed that by making the volume resistivity R1 of the matrix larger than $1.00 \times 10^{12}$ Ω·cm, the silica fine particles migrated from the toner are likely to adhere to the segment constituted by the matrix having a high volume resistivity.

The volume resistivity R1 (unit: Ω·cm) of the matrix can be measured with a microprobe after thinning the conductive layer. A means capable of producing a very thin sample, such as a sharp razor, a microtome, or a focused ion beam method (FIB), may be used for thinning. The specific procedure will be described hereinbelow.

The volume resistivity R1 of the matrix is $1.0 \times 10^5$ times or more the volume resistivity R2 of the domains. The matrix contains almost no electronic conductive agent such as carbon black, and has a higher electric resistance than the domains. Setting the relationship between R1 and R2 within the above range is effective from the viewpoint of forming a conductive path of the domains. Further, the migrated silica fine particles are less likely to adhere to the domain segments of the conductive member, which is effective in maintaining the charging uniformity.

Further, by making the volume resistivity R2 of the domains lower, it is possible to more effectively limit the charge transport path to a path through a plurality of domains while suppressing unintended charge transfer in the matrix.

The R1 is preferably from $1.0 \times 10^5$ times to $1.0 \times 10^{20}$ times, more preferably from $1.0 \times 10^7$ times to $1.0 \times 10^{16}$ times, and even more preferably from $1.0 \times 10^{11}$ times to $1.0 \times 10^{16}$ times the R2.

The volume resistivity R2 of the domains is preferably from $1.00 \times 10^1$ Ω·cm to $1.00 \times 10^6$ Ω·cm.

Further, R2 is more preferably from $1.00 \times 10^1$ Ω·cm to $1.00 \times 10^4$ Ω·cm, and further preferably from $1.00 \times 10^1$ Ω·cm to $1.00 \times 10^2$ Ω·cm.

Since the volume resistivity R2 of the domains is in the above range, the amount of charges transferred in the domains can be dramatically improved, and thus the charge transport path can be more effectively limited to the domains.

The volume resistivity R2 of the domains may be adjusted, for example, by changing the type and addition amount of the electronic conductive agent with respect to the rubber component of the domains.

The matrix contains a first rubber, and each of the domains contains a second rubber and an electronic conductive agent.

A rubber composition containing a rubber material for the matrix (first rubber) may be used as a rubber material for the domains (second rubber). Details will be described hereinbelow.

In order to form the matrix-domain structure, it is preferable that the difference in a solubility parameter (SP value) with the rubber material forming the matrix be within a certain range. That is, the absolute value of the difference between the SP value of the first rubber and the SP value of the second rubber is preferably from 0.4 $(J/cm^3)^{0.5}$ to 5.0 $(J/cm^3)^{0.5}$. Further, this value is more preferably from 0.4 $(J/cm^3)^{0.5}$ to 2.2 $(J/cm^3)^{0.5}$.

The volume resistivity R2 of the domains can be adjusted by selecting, as appropriate, the type and addition amount of the electronic conductive agent. An electronic conductive agent that makes it possible to change significantly the volume resistivity from high resistance to low resistance by the dispersed amount of the agent is preferable as the electronic conductive agent to be used for controlling the volume resistivity R2 of the domains to be from $1.00 \times 10^1$ Ω·cm to $1.00 \times 10^6$ Ω·cm.

Examples of the electronic conductive agent to be blended in the domains include carbon black, graphite, oxides such as titanium oxide, and tin oxide, metals such as Cu and Ag, particles coated with an oxide or a metal to make them electrically conductive, and the like. Further, if necessary, two or more kinds of these conductive agents may be blended and used in an appropriate amount.

Among the above electronic conductive agents, it is preferable to use conductive carbon black, which has a large affinity with rubber and makes it possible to control easily the distance between the electronic conductive agents. The type of carbon black to be blended in the domains is not particularly limited. Specific examples thereof include gas furnace black, oil furnace black, thermal black, lamp black, acetylene black, Ketjen black, and the like.

Among them, conductive carbon black having a DBP oil absorption amount from 40 $cm^3/100$ g to 170 $cm^3/100$ g, which can impart high conductivity to the domains, can be preferably used.

The amount of the electronic conductive agent such as conductive carbon black is preferably from 20 parts by mass to 150 parts by mass, and more preferably from 50 parts by mass to 100 parts by mass with respect to 100 parts by mass of the second rubber contained in the domains.

It is preferable that the electronic conductive agent be blended in an amount larger than that in the conductive member for general electrophotography. As a result, the volume resistivity R2 of the domains can be easily controlled within the range from $1.00 \times 10^1$ Ω·cm to $1.00 \times 10^6$ Ω·cm.

Further, if necessary, a filler, a processing aid, a crosslinking aid, a crosslinking accelerator, an antiaging agent, a crosslinking accelerator, a crosslinking retarder, a softener, a dispersant, a colorant, and the like which are generally used as compounding agents for rubber may be added to the rubber composition for domains within a range that does not impair the effects according to the present disclosure.

The volume resistivity R2 of the domains may be measured by the same method as that suitable for measuring the volume resistivity R1 of the matrix, except that the measurement site is changed to a place corresponding to the domain and the applied voltage at the time of measuring the current value is changed to 1 V. The specific procedure will be described hereinbelow.

Here, it is preferable that the volume resistivity of the domains be uniform. In order to improve the uniformity of the volume resistivity of the domains, it is preferable to make the amount of the electronic conductive agent in each domain uniform. This can further stabilize the discharge from the outer surface of the conductive member to the body to be charged.

From the viewpoint of charge transfer between the domains, it is preferable that the arithmetic mean value Dm of the distances between the adjacent wall surfaces of the domains in the conductive layer (hereinafter, also simply referred to as the "interdomain distance Dm") in the cross-section observation of the conductive member be, for example, from 0.10 to 7.00 µm, more preferably from 0.20 to 7.00 µm, and further preferably from 0.20 to 6.00 µm.

In order to accumulate more sufficient amount of electric charges in the domains by reliably separating the domains by the insulating regions (matrix), the interdomain distance Dm may be set, for example, from 0.20 to 2.00 µm. By setting the interdomain distance Dm in the above range, the charging uniformity of the electrophotographic photosensitive member is further improved, and roughness of a halftone image is improved.

The interdomain distance Dm may be measured in the following manner.

First, a sample is cut out by the same method as the method for measuring the volume resistivity of the matrix described above. Further, in order to suitably observe the matrix-domain structure, a pretreatment such as dyeing or vapor deposition that can ensure a favorable contrast between the conductive phase and the insulating phase may be performed.

The presence of the matrix-domain structure is confirmed by observing with a scanning electron microscope (SEM) the slice on which a fracture surface has been formed and platinum has been vapor-deposited.

In this process, from the viewpoint of accuracy of quantitative representation of the domain area, it is preferable to perform the SEM observation at a magnification of from 1,000 to 100,000 times. The specific procedure will be described hereinbelow.

A smaller arithmetic mean value D of the circle-equivalent diameter of the domains in the conductive layer in the cross-section observation of the conductive member (hereinafter, simply referred to as domain diameter D) is preferable.

The domain diameter D is, for example, preferably from 0.10 µm to 6.00 µm, and more preferably from 0.10 to 5.00 µm. For example, the domain diameter D is preferably 0.10 µm or more, 0.15 µm or more, and 0.20 µm or more. Further, for example, the domain diameter D is preferably 6.00 µm or less, 5.00 µm or less, 2.00 µm or less, 1.00 µm or less, 0.50 µm or less, and 0.40 µm or less. These numerical ranges can be combined as appropriate. When the domain diameter D is in the above range, a high effect can be expected.

At least a part of each domain is exposed at the outer surface of the conductive member, and the outer surface of the conductive member is composed of at least a matrix and domains exposed at the outer surface of the conductive member.

Further, it is preferable that the domains create protruded portions on the outer surface of the conductive member.

It is preferable that the outer surface of the conductive member comprises the surface of the matrix and the surface of the domains, and that the outer surfaces of the conductive members have protruded portions created by the domains.

In the transfer process, the untransferred toner (reverse toner) that has not been transferred to the intermediate transfer belt or paper has a polarity opposite to that of the conductive member, and thus tends to adhere to the conductive member.

As a result of the study, it was found that the protruded portions created by the domains can prevent the reverse toner from adhering to the surface of the conductive member.

The inventors consider that the reason for this is that at the contact portion between the conductive member and the electrophotographic photosensitive member, the protruded portions created by the domains on the surface of the conductive member actively contact the reverse toner, and injection charging is generated.

Where the adhesion of the reverse toner to the conductive member is suppressed, the charging uniformity of the conductive member is easily maintained, so that the image density uniformity of the halftone image can be further improved.

The height of the protruded portions created by the domains present on the outer surface of the conductive member is preferably from 15 nm to 250 nm, and more preferably from 50 nm to 200 nm. When the height of the protruded portions is within the above range, it is possible to increase the chance of contact with the reverse toner, and it is possible to suppress the occurrence of uneven discharge caused by the protruded portions.

The arithmetic mean value Dms (µm) of the distances between adjacent wall surfaces of the domains in the conductive layer when observing the outer surface of the conductive member is preferably, for example, from 0.20 to 7.00 µm, and more preferably from 0.20 to 6.00 µm. For example, the Dms may be 0.20 µm or more, 0.50 µm or more, 1.00 µm or more, 2.00 µm or more, or 4.00 µm or more. Further, it may be 7.00 µm or less, 6.00 µm or less, or 5.00 µm or less. By setting the interdomain distance Dms within the above range, the durability of the charging characteristic of the conductive member is further improved, and the halftone density is maintained better during long-term use.

Further, the arithmetic mean value Ds of the circle-equivalent diameters of the domains in the conductive layer when observing the outer surface of the conductive member is defined as the domain diameter Ds (µm). In this case, the Ds is preferably from 0.10 µm to 2.00 µm, more preferably from 0.15 µm to 1.00 µm, and further preferably from 0.20 µm to 0.70 µm.

The conductive member may be formed, for example, by a method including the following steps (i) to (iv).

Step (i): a step of preparing a domain-forming rubber mixture (hereinafter, also referred to as "CMB") including an electronic conductive agent such as carbon black and the second rubber.

Step (ii): a step of preparing a matrix-forming rubber mixture (hereinafter also referred to as "MRC") including the first rubber.

Step (iii): a step of kneading CMB and MRC to prepare a rubber mixture having a matrix-domain structure.

Step (iv): a step of forming a layer of the rubber mixture prepared in step (iii) on a conductive support directly or with another layer interposed therebetween, and curing the layer of the rubber composition is cured to form a conductive layer.

The requirement (A) and requirement (B) can be controlled, for example, by selecting the materials to be used in each of the above steps and adjusting the production conditions. This will be described hereinbelow.

Regarding the requirement (B), the volume resistivity of the matrix is determined by the composition of MRC.

A rubber having low conductivity is preferable as the first rubber used for MRC.

Such rubber may be at least one rubber selected from the group consisting of natural rubber, butadiene rubber, butyl rubber, acrylonitrile butadiene rubber, urethane rubber, silicone rubber, fluororubber, isoprene rubber, chloroprene rubber, styrene butadiene rubber, ethylene propylene rubber, ethylene propylene diene rubber, and polynorbornene rubber.

The first rubber is preferably at least one selected from the group consisting of butyl rubber, styrene butadiene rubber, and ethylene propylene diene rubber.

Further, provided that the volume resistivity of the matrix is within the above range, a filler, a processing aid, a crosslinking agent, a crosslinking aid, a crosslinking accelerator, a crosslinking enhancing agent, a crosslinking retarder, an antiaging agent, a softening agent, a dispersant, a coloring agent and the like may be added, as necessary to the MRC. Meanwhile, it is preferable that the MRC does not contain an electronic conductive agent such as carbon black in order to keep the volume resistivity of the matrix within the above range.

Further, regarding the requirement (B), the adjustment can be made by the amount of the electronic conductive agent in the CMB. For example, where the conductive carbon black having a DBP oil absorption from 40 $cm^3$/100 g to 170 $cm^3$/100 g (preferably from 40 $cm^3$/100 g to 80 $cm^3$/100 g) is used as the electronic conductive agent, the requirement (B) can be achieved by preparing the CMB so as to include the conductive carbon black in an amount of from 40 parts by mass to 200 parts by mass of with respect to 100 parts by mass of the second rubber.

Furthermore, regarding the distributed state related to the domains such as the interdomain distances Dm and Dms and the domain diameters D and Ds, it is effective to control the following four parameters (a) to (d).

(a) Difference in interfacial tension a between CMB and MRC.

(b) Ratio ($\eta m/\eta d$) of MRC viscosity ($\eta m$) and CMB viscosity ($\eta d$).

(c) Shear rate ($\gamma$) during kneading of CMB and MRC and energy amount (EDK) during shearing in step (iii).

(d) Volume fraction of CMB with respect to MRC in step (iii).

(a) Difference in Interfacial Tension between CMB and MRC

Generally, when two types of incompatible rubbers are mixed, phase separation occurs. This is because the interaction between the same polymers is stronger than the interaction between the different polymers, so that the same polymers agglomerate to reduce the free energy and cause stabilization.

Since the interface of the phase-separated structure comes into contact with different polymers, the free energy becomes higher than that on the inside which is stabilized by the interaction of the same molecules. As a result, in order to reduce the free energy of the interface, interfacial tension aimed at the reduction in area of contact with the different polymer is generated. When the interfacial tension is small, even different polymers tend to be mixed more uniformly in order to increase entropy. The state of being uniformly mixed is dissolution, and the SP value (solubility parameter), which is a measure of solubility, and the interfacial tension tend to be correlated.

That is, it is considered that the difference in interfacial tension between CMB and MRC correlates with the difference in SP value between the rubbers contained therein. The difference between the absolute values of solubility parameter (SP value) of the first rubber in MRC and solubility parameter (SP value) of the second rubber in CMB is preferably from 0.4 $(J/cm^3)^{0.5}$ to 5.0 $(J/cm^3)^{0.5}$. More preferably, rubbers may be selected such that the difference is from 0.4 $(J/cm^3)^{0.5}$ to 2.2 $(J/cm^3)^{0.5}$. Within this range, a stable phase separation structure can be formed, and the domain diameter D of CMB can be reduced.

Here, the second rubber that can be used for CMB can be specifically exemplified by at least one rubber selected from the group consisting of natural rubber (NR), isoprene rubber (IR), butadiene rubber (BR), acrylonitrile butadiene rubber (NBR), styrene butadiene rubber (SBR), butyl rubber (IIR), ethylene propylene rubber (EPM), ethylene propylene diene rubber (EPDM), chloroprene rubber (CR), nitrile rubber (NBR), hydrogenated nitrile rubber (H-NBR), silicone rubber, and urethane rubber (U).

The second rubber is preferably at least one selected from the group consisting of styrene butadiene rubber (SBR), butyl rubber (IIR), and acrylonitrile butadiene rubber (NBR), and more preferably at least one selected from the group consisting of styrene butadiene rubber (SBR) and butyl rubber (IIR).

The thickness of the conductive layer is not particularly limited as long as the intended function and effect of the conductive member can be obtained. The thickness of the conductive layer is preferably from 1.0 mm to 4.5 mm.

The mass ratio of domains to matrix (domain:matrix) is preferably from 5:95 to 40:60, more preferably from 10:90 to 30:70, and further preferably from 15:85 to 25:75.

Method for Measuring SP Value

The SP value can be calculated accurately by creating a calibration curve using a material with a known SP value. As the known SP value, the catalog value of the material manufacturer can be used. For example, the SP value of NBR and SBR does not depend on the molecular weight, and is substantially determined by the content ratio of acrylonitrile and styrene.

Therefore, by analyzing the content ratio of acrylonitrile or styrene in the rubbers constituting the matrix and domains by using an analysis method such as pyrolysis gas chromatography (Py-GC) and solid-state NMR, it is possible to calculate the SP value calibration curve obtained from a material having a known SP value.

The SP value of isoprene rubber is determined by an isomer structure of 1,2-polyisoprene, 1,3-polyisoprene, 3,4-polyisoprene, cis-1,4-polyisoprene, trans-1,4-polyisoprene, and the like. Therefore, similarly to SBR and NBR, it is possible to analyze the isomer content ratio by Py-GC, solid-state NMR, and the like, and the SP value can be calculated from a material having a known SP value.

The SP value of a material with a known SP value is obtained by a Hansen sphere method.

(b) Viscosity Ratio of CMB and MRC

The closer the (CMB viscosity/MRC viscosity) ratio ($\eta d/\eta m$) of CMB viscosity to MRC viscosity to 1, the smaller the domain diameters D and Ds can be made.

Specifically, the (CMB viscosity/MRC viscosity) ratio is preferably from 1.0 to 2.0. The (CMB viscosity/MRC viscosity) ratio can be adjusted by selecting the Mooney viscosity of the raw material rubbers used for CMB and MRC, and by changing the type and amount of the filler to be blended.

It is also possible to add a plasticizer such as paraffin oil to the extent that the formation of a phase-separated structure is not impaired. Further, the viscosity ratio can be adjusted by adjusting the temperature during kneading. The viscosity of the rubber mixture for forming the domains and the rubber mixture for forming the matrix can be obtained by measuring the Mooney viscosity ML (1+4) at the rubber temperature during kneading on the basis of JIS K 6300-1: 2013.

(c) Shear Rate During Kneading of MRC and CMB, and Energy Amount During Shear

The interdomain distances Dm and Dms can be made smaller as the shear rate during kneading of MRC and CMB is higher and the energy amount at the time of shear is larger.

The shear rate can be increased by increasing the inner diameter of a stirring member such as a blade or screw of a kneading machine, decreasing a gap between the end surface of the stirring member and the inner wall of the kneading machine, or increasing the rotation speed. Further, the energy at the time of shearing can be increased by increasing the rotation speed of the stirring member or by increasing the viscosities of the second rubber in the CMB and the first rubber in the MRC.

(d) Volume Fraction of CMB with Respect to MRC

The volume fraction of CMB with respect to MRC correlates with the collision coalescence probability of the domain-forming rubber mixture with respect to the matrix-forming rubber mixture. Specifically, when the volume fraction of the domain-forming rubber mixture with respect to the matrix-forming rubber mixture is reduced, the collision and coalescence probability of the domain-forming rubber mixture and the matrix-forming rubber mixture decreases. That is, the interdomain distances Dm and Dms can be reduced by reducing the volume fraction of the domains in the matrix within a range where the required conductivity can be obtained. The volume fraction of the CMB with respect to the MRC (that is, the volume fraction of the domains with respect to the matrix) is preferably from 15% to 40%.

Carbon black having a DBP oil absorption amount of from 40 $cm^3$/100 g to 80 $cm^3$/100 g can be particularly preferably used as the electronic conductive agent in order to obtain domains densely filled with the electronic conductive agent. The DBP oil absorption amount ($cm^3$/100 g) is the volume of dibutyl phthalate (DBP) that can be absorbed by 100 g of carbon black, and this amount can be measured according to Japanese Industrial Standard (JIS) K 6217-4: 2017 (Carbon Black for Rubber: Basic Characteristics—Part 4: Measurement of Oil Absorption Amount (Including Compressed Sample)). Generally, carbon black has a tufted higher-order structure in which primary particles having an average particle diameter of from 10 nm to 50 nm are aggregated. This tufted higher-order structure is called a structure, and the degree thereof is quantified by the DBP oil absorption ($cm^3$/100 g).

Generally speaking, carbon black with a well-developed structure has a high ability to reinforce rubber, such carbon black is poorly incorporated into rubber, and the shear torque during kneading is extremely high. Therefore, it is difficult to increase the filling amount in the domains.

Meanwhile, the conductive carbon black having a DBP oil absorption within the above range has a less-developed structure configuration, so that the carbon black is less aggregated and has good dispersibility in rubber. Therefore, the filling amount in the domains can be increased, and as a result, the outer shape of the domain can be more easily brought closer to a sphere.

Furthermore, in carbon black with a well-developed structure, carbon black particles tend to aggregate together, and the aggregates tend to form lumps with large uneven structures. Where such an aggregate is included in the domain, it is difficult to obtain the domain satisfying the requirement (B). The formation of aggregates may affect the shape of the domains and lead to the formation of an uneven structure. Meanwhile, conductive carbon black having a DBP oil absorption within the above range is preferable because the aggregates are unlikely to be formed.

In order to further reduce the concentration of electric field between the domains, the outer shape of the domains may be brought closer to a sphere. For that purpose, the domain diameter D may be made smaller within the above range. As a method therefor, for example, in the step (iii), MRC and CMB are kneaded so that MRC and CMB are phase-separated. Then, a method for controlling the CMB domain diameter D to a smaller value in the step of preparing a rubber mixture in which CMB domains are formed in the MRC matrix can be used. By reducing the CMB domain diameter D, the specific surface area of the CMB domains increases and the interface with the matrix increases, so that tension that tends to reduce the tension acts on the interface of the CMB domains. As a result, the external shape of the CMB domains is closer to that of a sphere.

Here, regarding the factors that determine the domain diameter in the matrix-domain structure formed when two incompatible polymers are melt-kneaded, a Taylor's equation (formula (6)), a Wu's empirical equation (formulas (7), (8)), and a Tokita's equation (formula (9)) are known.

Taylor's equation $$D=[C\cdot\sigma/\eta m\cdot\gamma]\cdot f(\eta m/\eta d) \quad (6)$$

Wu's empirical equation $$\gamma\cdot D\cdot\eta m/\sigma=4(\eta d/\eta m)0.84\cdot\eta d/\eta m>1 \quad (7)$$

$$\gamma\cdot D\cdot\eta m/\sigma=(\eta d/\eta m)-0.84\cdot\eta d/\eta m<1 \quad (8)$$

Tokita's equation $$D=12\cdot P\cdot\sigma\cdot\varphi/(\pi\cdot\eta\cdot\gamma)\cdot(1+4\cdot P\cdot\varphi\cdot EDK/(\pi\cdot\eta\cdot\gamma)) \quad (9)$$

In the formulas (6) to (9), D is the maximum Feret diameter of the CMB domains, C is a constant, σ is the interfacial tension, ηm is the matrix viscosity, ηd is the domain viscosity, γ is the shear rate, and η is the viscosity of a mixed system, P is the collision coalescence probability, φ is the domain phase volume, and EDK is the domain phase cutting energy.

Regarding the requirements (A) and (B), it is effective to reduce the domain diameter according to the formulas (6) to (9) in order to improve the uniformity of interdomain distance. Further, in the process in which the raw material rubber of the domains is split and the particle diameter thereof is gradually reduced in the step of kneading MRC and CMB, the interdomain distance changes depending on when the kneading step is stopped.

Therefore, the uniformity of the interdomain distance can be controlled by the kneading time in the kneading process and the kneading rotation speed that is an index of kneading intensity. The longer the kneading time and kneading rotation speed, the more uniform the interdomain distance can be.

Method for Forming Protruded Portions by Domains on Outer Surface of Conductive Member A method for forming the protruded portions by the domains can involve grinding the outer surface of the conductive member. Further, the inventors believe that since the conductive layer has a matrix-domain structure, the protruded portions can be preferably formed by a grinding step using a grindstone. For example, the protruded portions may be formed by a method of grinding with a polishing grindstone in a plunge type polishing machine.

The protruded portions of the domain supposedly can be formed by grindstone polishing according to the following mechanism.

First, when the domains dispersed in the matrix are filled with, for example, carbon black, which is an electronic conductive agent, the reinforcing property is higher than that of the matrix not filled with carbon black. Therefore, it is possible to form the protruded portions by the domains by using the difference in the grindability caused by the difference in the reinforcing property. Specifically, it is believed that when the grinding process with the same grindstone is performed, since the domains have high reinforcing property, they are less likely to be ground than the matrix.

A polishing grindstone for a plunge type polishing machine will be described hereinbelow.

The surface roughness of a polishing grindstone can be selected, as appropriate, according to the polishing efficiency and the type of the constituent material of the conductive layer. The surface roughness of the grindstone can be adjusted by the type of abrasive grains, the grain size of abrasive grains, the degree of bonding of abrasive grains, the binder of abrasive grains, the texture of abrasive grains (abrasive grain ratio), and the like.

The "grain size of the abrasive grains" indicates the size of the abrasive grains and is expressed as, for example, #80. The number in this case means how many meshes there are per inch (25.4 mm) of the mesh for selecting the abrasive grains, and the larger the number, the finer the abrasive grains. The "degree of bonding of abrasive grains" indicates hardness and is represented by letters A to Z. The closer the degree of bonding to A, the softer the grain, and the closer the degree of bonding to Z, the harder the grain. The larger the amount of the binder contained in the abrasive grains, the higher is the binding degree of the grindstone. The abovementioned "texture of abrasive grains (abrasive grain ratio)" represents the volume ratio of the abrasive grains in the total volume of the grindstone, and the magnitude of the texture represents the density of the texture. The larger the number indicating the texture, the coarser the texture. A grindstone having a large texture number and large pores is called a porous grindstone, and the advantage thereof is that clogging and burning of the grindstone are prevented.

Generally, the polishing grindstone can be manufactured by mixing raw materials (abrasive material, binder, porosity agent, and the like), press molding, drying, firing and finishing. As the abrasive grains, green silicon carbide material (GC), black silicon carbide material (C), white alumina (WA), brown alumina (A), zirconia alumina (Z) and the like can be used. These materials can be used alone or as a mixture of a plurality thereof. Further, as the abovementioned binder, vitrified (V), resinoid (B), resinoid reinforcement (BF), rubber (R), silicate (S), magnesia (Mg), shellac (E), and the like can be used according to the application.

Here, the outer diameter shape of the polishing grindstone in the longitudinal direction is preferably an inverted crown shape in which the outer diameter gradually decreases from the end to the center so that the conductive roller can be polished into the crown shape. The outer diameter shape of the polishing grindstone is preferably a shape of an arc curve or a quadratic or higher order curve with respect to the longitudinal direction. In addition to this, the outer diameter shape of the polishing grindstone may be represented by various mathematical expressions such as a quartic curve and a sine function. The outer shape of the polishing grindstone is preferably such that the outer diameter changes smoothly, but a shape in which an arc curve or the like is approximated to a polygonal shape by a straight line may be used as well. The width of the polishing grindstone in the direction corresponding to the axial direction is preferably equal to or greater than the width of the conductive roller in the axial direction.

The protruded portions can be formed by the domains by appropriately selecting the grindstone in consideration of the factors mentioned above and performing the grinding process under the conditions that promote the difference in the grindability between the domains and the matrix.

Specifically, it is preferable to use a condition that suppresses polishing, and a condition of using abrasive grains having poor sharpness. For example, a method of shortening the time of a precision polishing process after rough grinding, using a treated grindstone (abrasive grains can be abraded by polishing the surface of a grindstone dressed with a rubber member including abrasive grains; a grindstone treated with a rubber member), and the like can be used.

Method for Confirming Matrix-Domain Structure

The presence of the matrix-domain structure in the conductive layer can be confirmed by preparing a thin piece from the conductive layer and observing the fracture surface formed on the thin piece in detail. The specific procedure will be described hereinbelow.

The requirement (C) is described hereinbelow.

Requirement (C):

The toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy (ESCA).

The present inventors have found that the above problems can be remarkably resolved by using an electrophotographic apparatus equipped with a specific conductive member as described above and a specific toner described below.

When the coverage ratio of the toner surface by the silica fine particles which is determined by X-ray photoelectron spectroscopy (ESCA) is in the above range, the adhesion of the toner to the electrophotographic photosensitive member is likely to be reduced, and the satisfactory flowability and charging performance of the toner are likely to be maintained even in repeated use for a long period of time.

Further, the exposure of the toner particle surface due to the embedding of silica fine particles can be suppressed and high flowability can be maintained even in a high-speed process and repeated use for a long period of time.

In addition, since the silica fine particles that have migrated to the conductive member do not hinder the discharge, it is possible to maintain the charging uniformity even in repeated use for a long period of time.

The coverage ratio is preferably from 70.0% by area to 95.0% by area, and more preferably from 80.0% by area to 95.0% by area.

Further, the coverage ratio can be adjusted to the above range by adjusting the addition amount of silica fine particles, particle diameter, external addition conditions, and properties of toner particles.

The toner will be explained hereinbelow. It is desirable that the deterioration of the toner be suppressed and that even if the migrated silica fine particles adhere to the conductive member, the adhesion does not easily affect the charging uniformity of the conductive member.

The fine silica particles can be exemplified by fine particles generated by vapor phase oxidation of a silicon halogen compound, which are called dry silica or fumed silica.

For example, a thermal decomposition oxidation reaction of silicon tetrachloride gas in oxygen and hydrogen is used, and the basic reaction formula is as follows.

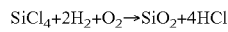

$$SiCl_4 + 2H_2 + O_2 \rightarrow SiO_2 + 4HCl$$

In this manufacturing process, it is possible to obtain composite fine particles of silica and another metal oxide, for example, by using another metal halogen compound such as aluminum chloride or titanium chloride together with a silicon halogen compound.

The number-average particle diameter of a primary particle of the silica fine particle may be from 5 nm to 45 nm, preferably from 5 to 25 nm, more preferably from 5 nm to 15 nm, and further preferably from 7 nm to 15 nm.

When the number-average particle diameter (D1) of a primary particle of the silica fine particle is within the above range, the frequency of collision between the toner particles and the silica fine particles tends to be higher than that between the silica fine particles during the external additive mixing treatment, and it becomes easier to control the coverage ratio and the embedding of the external additive.

Further, the silica fine particles do not easily aggregate with each other, and are unlikely to be present as aggregates even on the surface of the toner particle. When the aggregates of the silica fine particles are unlikely to be formed, the silica fine particles are unlikely to be broken and are not easily detached from the toner particle surface by the rubbing of the toner particles even in repeated use. A method for measuring the number-average particle diameter (D1) of a primary particle of the silica fine particle will be described hereinbelow.

Therefore, even if the silica fine particles are added to adjust the coverage ratio in the initial stage of repeated use, the coverage ratio with silica fine particles is unlikely to decrease until the latter stage of repeated use. Further, since the aggregates are less likely to be formed, the silica fine particles are less likely to be embedded in the toner particle by the forces acting between the silica fine particles, the physical property change of the toner between the initial stage of repeated use and the latter stage of repeated use is small and toner deterioration is less likely to occur.

In order to ensure satisfactory flowability of the toner through repeated use for a long period of time, the silica fine particles preferably have a BET specific surface area of from 130 m$^2$/g to 330 m$^2$/g, and more preferably from 200 m$^2$/g to 320 m$^2$/g.

The silica fine particles may be hydrophobized. The silica fine particles preferably have an apparent density of from 15 g/L to 50 g/L, and more preferably from 18 g/L to 45 g/L.

When the apparent density of silica fine particles is in the above range, it is difficult for the silica fine particles to be densely packed, and a large amount of air is present between the fine particles, indicating that the apparent density is very low. For this reason, in the toner as well, the toner particles are unlikely to be densely packed with each other, so that the speed of deterioration can be reduced.

As means for controlling the apparent density of the silica fine particles within the above range, the particle diameter of the silica fine particle raw material to be used for the silica fine particles, the presence or absence of pulverizing treatment and intensity thereof, and the addition amount of a treatment agent to be used for hydrophobizing treatment such as silicone oil may be adjusted.

By reducing the particle diameter of the silica fine particle raw material, the BET specific surface area of the obtained silica fine particles is increased and a large amount of air can be intervened, so that the apparent density can be reduced. Further, by performing the pulverizing treatment, relatively large secondary particles contained in the silica fine particles can be disentangled into the relatively small secondary particles, and the apparent density can be reduced.

The silica fine particles may be hydrophobized with silicone oil taken in an amount of from 15.0 parts by mass to 40.0 parts by mass based on 100 parts by mass of the silica fine particle raw material.

As for the degree of the hydrophobizing treatment, from the viewpoint of suppressing a decrease in charging performance in a high-temperature and high-humidity environment, it is preferable that a degree of hydrophobicity measured by a methanol titration test be 70% or more, more preferably 80% or more.

Examples of the silicone oil include dimethyl silicone oil, methylphenyl silicone oil, α-methylstyrene modified silicone oil, chlorophenyl silicone oil, and fluorine-modified silicone oil.

The kinematic viscosity of the silicone oil at 25° C. may be from about 30 cSt to about 1,000 cSt, preferably from about 30 cSt to about 500 cSt, and more preferably from about 40 cSt to about 300 cSt.

When the kinematic viscosity is in the above range, it is easy to control the treatment uniformity when the silica fine particle raw material is subjected to hydrophobizing treatment with silicone oil.

Further, the kinematic viscosity of the silicone oil is closely related to the molecular chain length of the silicone oil, and it is preferable that the kinematic viscosity be in the above range, because it is easy to control the degree of aggregation of silica fine particles to a suitable range.

As a device for measuring the kinematic viscosity of silicone oil, a capillary kinematic viscometer (manufactured by Kabuki Kagaku Kikai Kogyo Co., Ltd.) or a fully automatic trace kinematic viscometer (manufactured by Viscotec Co., Ltd.) can be mentioned.

The silica fine particles may be treated with at least one compound selected from the group consisting of silane coupling agents such as an alkoxysilane and a silazane after treating the silica fine particle raw material with silicone oil.

When the hydrophobizing treatment with silicone oil is insufficient, the surface of the silica fine particle raw material can be further subjected to the hydrophobizing treatment, so that the silica fine particles having a high degree of hydrophobicity can be stably obtained.

Also, it is easy to improve the ease of toner loosening. The details of the reason why the ease of toner loosening can be improved have not been clarified, but the present inventors consider the following reason.

Among the silicone oil molecule terminals on the surface of the silica fine particles, only the terminal on one side has the degree of freedom, which affects the aggregation property of the silica fine particles. Meanwhile, by carrying out the two-step treatment as described above, the silicone oil molecule terminals are almost absent on the outermost surface of the silica fine particles. Therefore, the aggregation property of the silica fine particles can be further reduced. As a result, the aggregation property of the toner particles after the silica fine particles have been externally added thereto can be significantly reduced, and the ease of toner loosening can be improved.

The silica fine particles may be pulverized during or after the hydrophobizing treatment step. Furthermore, when performing a two-step process, it is also possible to perform the pulverization between the steps.

Either dry treatment or wet treatment may be used for the surface treatment of the silica fine particle raw material with silicone oil and the surface treatment with a silane coupling agent such as alkoxysilane and silazane.

As a specific treatment procedure, for example, the silica fine particle raw material is put into a solvent (preferably adjusted to pH 4 with an organic acid or the like) in which silicone oil is dissolved and a reaction is carried out, and then the solvent is removed. After that, a pulverizing treatment may be performed.

Next, the silicone oil-treated and pulverized silica fine particles are placed in a solvent in which a silane coupling agent such as an alkoxysilane and a silazane is dissolved and a reaction is carried out. Then, the solvent is removed and pulverizing treatment is performed. Further, the following method may be used. For example, in the surface treatment with silicone oil, the silica fine particle raw material is put into a reaction tank. Then, under a nitrogen atmosphere, alcohol water is added with stirring, silicone oil is introduced into the reaction tank to perform surface treatment, heating and stirring are further performed to remove the solvent, and pulverizing treatment is performed. In the surface treatment with a silane coupling agent such as an alkoxysilane and a silazane, the surface treatment is carried out by introducing the alkoxysilane, silazane, and the like while stirring under a nitrogen atmosphere, and heating and stirring are further performed to remove the solvent, followed by cooling.

Suitable examples of the alkoxysilane include methyltrimethoxysilane, dimethyldimethoxysilane, phenyltrimethoxysilane, methyltriethoxysilane, dimethyldiethoxysilane, and phenyltriethoxysilane. Meanwhile, the silazane can be preferably exemplified by hexamethyldisilazane.

The amount of the silane coupling agent such as an alkoxysilane and a silazane to be used for the treatment is preferably from 0.1 part by mass to 20.0 parts by mass based on 100 parts by mass of the silica fine particle raw material.

In order to increase the immobilization rate, based on the carbon content, of the silicone oil in the silica fine particles, it is necessary to chemically immobilize the silicone oil on the surface of the silica fine particle raw material in the process of obtaining the above-described silica fine particles. For that purpose, a method in which heat treatment is performed for the reaction of the silicone oil in the process of obtaining the silica fine particles can be preferably exemplified. The heat treatment temperature is preferably 100° C. or higher, and the higher the heat treatment temperature, the higher the immobilization rate can be. This heat treatment step is preferably performed immediately after the silicone oil treatment, but when the pulverizing treatment is performed, the heat treatment step may be performed after the pulverizing treatment step.

Examples of the silicone oil include dimethyl silicone oil, methylphenyl silicone oil, α-methylstyrene-modified silicone oil, chlorophenyl silicone oil, fluorine modified silicone oil, and the like.

The amount of the silica fine particles in the toner is preferably from 1.3 parts by mass to 3.0 parts by mass, and more preferably from 1.5 parts by mass to 2.0 parts by mass with respect to 100 parts by mass of the toner particles. When the amount of the silica fine particles is within the above range, it is easy to control the coverage ratio within the above range.

Further, in order to maintain the migration amount of the silica fine particles to the conductive member and the number of the silica fine particles that can exert the effect of dispersing mechanical stress on the toner particle surface, the fixing rate of the silica fine particle on the surface of the toner particle is preferably from 30.0 to 95.0%, and more preferably from 40.0 to 90.0%.

The fixing rate can be adjusted within the above range by adjusting the addition amount of silica fine particles, particle diameter, external addition conditions, and properties of toner particles.

The volume resistivity of the silica fine particle is preferably from $1.00 \times 10^{10}$ Ω·cm to $5.00 \times 10^{17}$ Ω·cm, more preferably from $1.00 \times 10^{12}$ Ω·cm to $1.00 \times 10^{17}$ Ω·cm, and even more preferably from $1.00 \times 10^{13}$ Ω·cm to $1.00 \times 10^{16}$ Ω·cm under the electric field strength of 5,000 V/cm.

When the volume resistivity of the silica fine particle is within the above range, it is easy to set the ability to provide an electric charge to the toner within an appropriate range, and it is also easy to suppress the charge-up of the toner and to suppress the occurrence of fogging during repeated use in a low-temperature and low-humidity environment.

The volume resistivity of the silica fine particle is adjusted to the above range by adjusting the number-average particle diameter of the a primary particle of the silica fine particle to the above range and by selecting, as appropriate, the kind and amount of silicone oil or other hydrophobizing agent used for the hydrophobizing treatment.

The toner particle includes a binder resin. The binder resin is not particularly limited, and the following polymers or resins may be used.

Homopolymers of styrene and substituents thereof such as polystyrene, poly-p-chlorostyrene, polyvinyltoluene, and the like; styrene-based copolymers such as styrene-p-chlorostyrene copolymer, styrene-vinyl toluene copolymer, styrene-vinyl naphthalene copolymer, styrene-acrylic acid ester copolymer, styrene-methacrylic acid ester copolymer, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer, styrene-acrylonitrile-indene copolymer, and the like; polyvinyl chloride, phenol resins, natural resin-modified phenol resins, natural resin-modified maleic acid resins, acrylic resins, methacrylic resins, polyvinyl acetate, silicone resins, polyester resins, polyurethane resins, polyamide resins, furan resin, epoxy resins, xylene resins, polyvinyl butyral, terpene resins, coumarone-indene resins, petroleum resins, and the like.

A method for producing the toner particles is not particularly limited, and a known method can be used.

Examples of suitable methods include a melting and kneading method, an emulsion aggregation method, a dissolution suspension method, a suspension polymerization method, and the like. For example, the toner particles may be manufactured in an aqueous medium.

For example, when toner particles are produced using a suspension polymerization method, a polymerizable monomer composition containing a polymerizable monomer capable of forming a binder resin, and if necessary, a release agent such as wax, a colorant, a magnetic substance, and the like is obtained. The resulting polymerizable monomer composition is dispersed in an aqueous medium containing a dispersion stabilizer and granulated, and the polymerizable monomer contained in the granulated particles is polymerized to obtain toner particles.

Examples of the polymerizable monomer are listed hereinbelow. Styrene-based monomers such as styrene, o-methylstyrene, m-methylstyrene, p-methylstyrene, p-methoxystyrene, p-ethylstyrene, and the like.

Acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate, phenyl acrylate, and the like.

Methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, and the like.

Further, the polymerizable monomer composition may contain a crosslinking agent. The crosslinking agent is mainly a compound having two or more polymerizable double bonds, for example, an aromatic divinyl compound, a carboxylic acid ester having two double bonds, a divinyl compound, and a compound having three or more vinyl groups. Specific examples thereof include divinylbenzene, 1,6-hexanediol diacrylate, and the like. These can be used alone or as a mixture of two or more kinds. The addition amount of the crosslinking agent is from about 0.1 part by mass to about 10.0 parts by mass with respect to 100 parts by mass of the polymerizable monomer.

In addition, the polymerizable monomer composition may contain an azo polymerization initiator such as 2,2'-azobis-(2,4-dimethylvaleronitrile), and a peroxide type polymerization initiator such as t-butylperoxypivalate, dilauroyl peroxide, and the like. The addition amount of the polymerization initiator is from about 0.5 parts by mass to 20.0 parts by mass with respect to 100 parts by mass of the polymerizable monomer.

The binder resin may be composed of one kind of the above-mentioned polymers or resins, or may be composed of two or more kinds in combination. For example, a styrene-acrylic acid ester copolymer and a polyester resin may be contained in combination. Examples of the polyester resin include a condensation polymer of a dihydric or higher alcohol component and an acid monomer component such as a divalent or higher carboxylic acid, a divalent or higher carboxylic acid anhydride, a divalent or higher carboxylic acid ester, and the like.

The toner particle may contain a magnetic body.

Examples of the magnetic body include magnetic iron oxides such as magnetite, maghemite, and ferrite, and magnetic iron oxides including other metal oxides; metals such as Fe, Co, and Ni, or alloys of these metals with metals such as Al, Co, Cu, Pb, Mg, Ni, Sn, Zn, Sb, Be, Bi, Cd, Ca, Mn, Se, Ti, W, and V, and mixtures thereof.

The amount of the magnetic bodies is preferably from 35 parts by mass to 100 parts by mass, and more preferably from 45 parts by mass to 95 parts by mass with respect to 100 parts by mass of the binder resin or the polymerizable monomer.

A known method may be used for manufacturing the magnetic body. Further, the magnetic material may be subjected to a hydrophobizing treatment using an alkyltrialkoxysilane coupling agent as a hydrophobizing agent.

The toner particle may contain a release agent. Examples of the release agent include the following known waxes. Monofunctional or bifunctional ester waxes such as saturated fatty acid monoesters and diesters, hydrocarbon waxes such as paraffin wax and Fischer-Tropsch wax, and the like. The melting point of the wax, which is defined by the peak temperature of the maximum endothermic peak at the time of temperature increase measured by a differential scanning calorimeter (DSC), is preferably from 60° C. to 140° C.

The amount of the release agent is preferably from 3 parts by mass to 40 parts by mass with respect to 100 parts by mass of the binder resin or the polymerizable monomer.

The toner particle may contain a charge control agent.

Organometallic complex compounds and chelate compounds are effective as charge control agents for negative charging, and examples thereof include monoazo metal complex compounds; acetylacetone metal complex compounds; metal complex compounds of aromatic hydroxycarboxylic acids or aromatic dicarboxylic acids, and the like.

The amount of the charge control agent is preferably from 0.1 parts by mass to 10.0 parts by mass, and more preferably from 0.1 parts by mass to 5.0 parts by mass with respect to 100 parts by mass of the binder resin or the polymerizable monomer.

The toner particles can use a magnetic body as a colorant. Further, the toner particles may contain a conventionally known colorant. The amount of the colorant other than the magnetic body is preferably from 1 part by mass to 20 parts by mass, and more preferably from 2 parts by mass to 15 parts by mass with respect to 100 parts by mass of the binder resin or the polymerizable monomer.

A method for producing toner particles using the suspension polymerization method will be specifically described hereinbelow, but this method is not limiting.

A polymerizable monomer capable of forming a binder resin, and if necessary, components such as a release agent such as wax, a colorant, a magnetic body, and a charge control agent are added, as appropriate, and a disperser such as a homogenizer, a ball mill, an ultrasonic wave disperser, and the like is used to uniformly dissolve or disperse the polymerizable monomer composition.

The obtained polymerizable monomer composition is suspended in an aqueous medium containing a dispersion stabilizer to granulate the droplet-particles of the polymerizable monomer composition.

At this time, the particle diameter of the obtained toner particles are made sharper by using a disperser such as a high-speed stirrer or an ultrasonic disperser to obtain at once the desired size of toner particles.

Regarding the timing of addition of the polymerization initiator and the like, they may be added at the same time when other components are added to the polymerizable monomer, or may be mixed immediately before the polymerizable monomer composition is suspended in an aqueous medium.

Also, a polymerization initiator dissolved in a polymerizable monomer or a solvent may be added immediately after the granulation and before the polymerization reaction is started.

After the granulation, a usual stirrer may be used to perform stirring to a degree such that the particle state is maintained and the particles are prevented from floating and settling.

A known surfactant, organic dispersant or inorganic dispersant can be used as the dispersion stabilizer. Among them, the inorganic dispersants can be preferably used because they are less likely to produce harmful ultrafine powder, have dispersion stability due to the steric hindrance thereof, so stability is unlikely to collapse even if the reaction temperature is changed, enable easy cleaning, and are less likely to adversely affect the toner particles. Examples of such inorganic dispersants include phosphoric acid polyvalent metal salts such as tricalcium phosphate, magnesium phosphate, aluminum phosphate, zinc phosphate, hydroxyapatite, and the like, and carbonates such as calcium carbonate, magnesium carbonate, and the like. In addition, inorganic salts such as calcium metasilicate, calcium sulfate, barium sulfate, and the like and inorganic compounds such as calcium hydroxide, magnesium hydroxide, aluminum hydroxide, and the like can also be mentioned.

The addition amount of these inorganic dispersants is preferably from about 0.20 parts by mass to about 20.00 parts by mass with respect to 100 parts by mass of the polymerizable monomer.

The dispersion stabilizers may be used alone or in combination of two or more kinds.

Further, from 0.0001 parts by mass to 0.1000 parts by mass of a surfactant may be used in combination with respect to 100 parts by mass of the polymerizable monomer.

In the polymerization reaction of the polymerizable monomer, the polymerization temperature may be set at 40° C. or higher, generally from 50° C. to 90° C.

After the polymerization of the polymerizable monomer is completed, the obtained polymer particles are filtered, washed and dried by a known method to obtain toner particles. A toner may be obtained by externally mixing the silica fine particles with the toner particles and adhering the silica fine particles to the surface of the toner particles.

For the external addition and mixing, a mixer such as a Henschel mixer or a ball mill may be used.

It is also possible to add a classification step to the production process (before mixing silica fine particles) to remove coarse powder and fine powder contained in the toner particles. As the external additive to be externally added and mixed, a known external additive other than the silica fine particles may be used as long as the effect of the present disclosure is not impaired.

From the viewpoint of balance of developing performance and fixing performance, the toner may have a weight average particle diameter (D4) of from about 5.0 µm to about 10.0 µm, and preferably from about 6.0 µm to about 9.0 µm.

Further, the average circularity of the toner particles is preferably from 0.960 to 1.000, and more preferably from 0.970 to 1.000. When the average circularity of the toner particles is in the above range, the toner has a spherical shape or a shape close to this, and it is easy to obtain uniform triboelectric charging performance with excellent flowability. Therefore, it becomes easy to maintain high developing performance even in the latter half of repeated use. With the toner particles obtained by the suspension polymerization method, since the shape of each individual toner particle is substantially spherical, it is easy to obtain toner particles satisfying the physical property requirement that the average circularity is 0.960 or more. Such toner particles also have a relatively uniform distribution of the charge quantity, so that improvement in image quality can be expected. Meanwhile, when the melt-kneading method is used, it is possible to control the average circularity within the above range by performing thermal spheroidization treatment, surface modification and fine powder removal.

In the case of producing toner particles by a melt-kneading method, for example, a binder resin and, if necessary, components such as a release agent such as wax, a coloring agent, a magnetic material, a charge control agent, and the like are sufficiently mixed with a mixer such as a Henschel mixer, a ball mill, or the like. After that, the toner material is dispersed or dissolved by melting and kneading with a heat kneader such as a heating roll, a kneader, or an extruder to the toner material, cooled and solidified, and then pulverized and, if necessary, subjected to surface treatment to obtain toner particles. Either the classification or the surface treatment may be performed first. In the classification step, a multi-division classifier may be used to ensure production efficiency.

Electrophotographic Apparatus

The electrophotographic apparatus has the following features.

An electrophotographic apparatus comprises:

an electrophotographic photosensitive member;

a charging device for charging a surface of the electrophotographic photosensitive member; and a developing device for developing an electrostatic latent image formed on the surface of the electrophotographic photosensitive member with a toner to form a toner image on the surface of the electrophotographic photosensitive member, wherein the charging device comprises a conductive member arranged to be capable of contacting the electrophotographic photosensitive member, and the developing device comprises the toner.

The above-mentioned toner and conductive member can be adopted in the electrophotographic apparatus.

The electrophotographic apparatus may include an image exposure device for irradiating the surface of the electrophotographic photosensitive member with image exposure light to form an electrostatic latent image on the surface of the electrophotographic photosensitive member;

a transfer device for transferring the toner image formed on the surface of the electrophotographic photosensitive member to a recording medium; and a fixing device for fixing the toner image transferred onto the recording medium to the recording medium.

An electrophotographic apparatus according to an embodiment of the present disclosure includes the above-mentioned conductive member.

Figure 5:
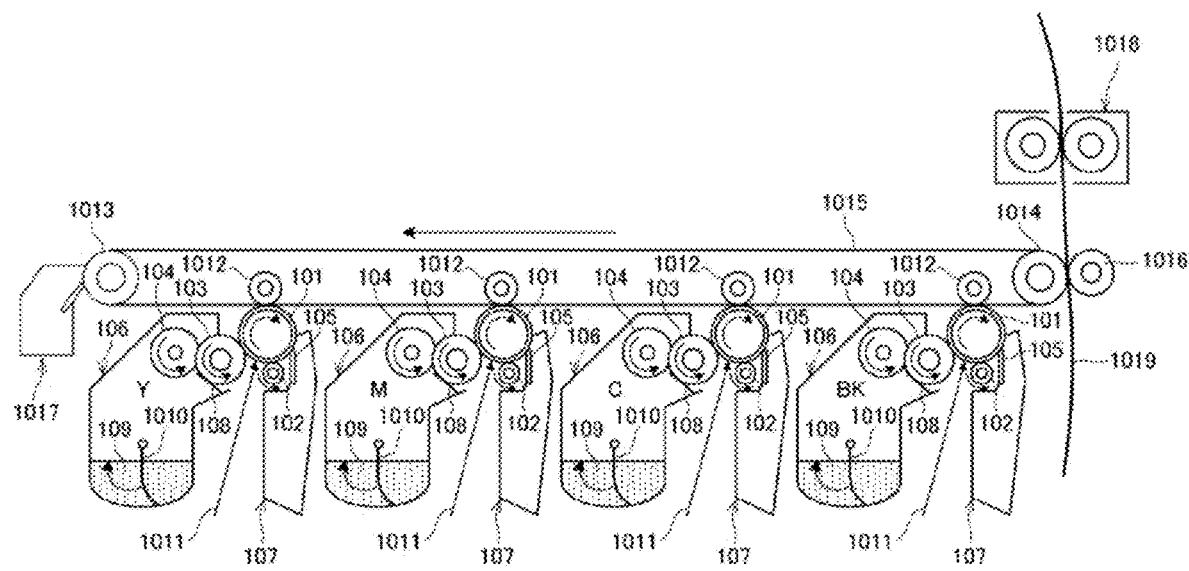
FIG. 5 is a cross-sectional schematic view of an electrophotographic apparatus.

As an example, FIG. 5 shows a schematic sectional view of an electrophotographic apparatus. This electrophotographic apparatus is a color electrophotographic apparatus including at least four electrophotographic photosensitive members (hereinafter also simply referred to as photosensitive drums), four charging means (hereinafter simply referred to as conductive rollers) for charging the surface of the electrophotographic photosensitive members, and four developing means (hereinafter, also simply referred to as developing rollers) for developing the electrostatic latent image formed on the surface of the electrophotographic photosensitive member with toner to form a toner image on the surface of the electrophotographic photosensitive member. Toners of black, magenta, yellow and cyan colors are supplied to respective developing rollers.

A photosensitive drum 101 rotates in the direction of the arrow and is uniformly charged by a conductive roller 102 to which a voltage is applied from a charging bias power source, and an electrostatic latent image is formed on the surface of the photosensitive drum by an exposure light 1011. Meanwhile, a toner 109 stored in a toner container 106 is supplied to a toner supply roller 104 by a stirring blade 1010 and is transported onto a developing roller 103.

Then, a developing blade 108 placed in contact with the developing roller 103 uniformly coats the toner 109 on the surface of the developing roller 103, and at the same time, charges the toner 109 by triboelectric charging. The electrostatic latent image is visualized as a toner image by developing with the toner 109 transported by the developing roller 103 placed in contact with the photosensitive drum 101.

The visualized toner image on the photosensitive drum is transferred to an intermediate transfer belt 1015, which is supported and driven by a tension roller 1013 and an intermediate transfer belt driving roller 1014, by a primary transfer roller 1012 to which a voltage is applied by a primary transfer bias power source. The toner images of the respective colors are sequentially superimposed to form a color image on the intermediate transfer belt.

A transfer material 1019 is fed into the apparatus by a paper feed roller and is transported between the intermediate transfer belt 1015 and a secondary transfer roller 1016. A voltage is applied to the secondary transfer roller 1016 from a secondary transfer bias power source, and the color image on the intermediate transfer belt 1015 is transferred onto the transfer material 1019. The transfer material 1019 onto which the color image has been transferred is fixed by a fixing device 1018 and discharged to the outside of the apparatus, thereby ending the printing operation.

Meanwhile, the untransferred toner remaining on the photosensitive drum is scraped off by a cleaning blade 105 and accommodated in the waste toner accommodation container 107, and the abovementioned steps are repeated on the cleaned photosensitive drum 101. Further, the untransferred toner remaining on the primary transfer belt is also scraped off by the cleaning device 1017.

Examples of the electrophotographic apparatus include a copying machine, a laser beam printer, an LED printer, an electrophotographic plate making system, and the like.

Process Cartridge

The process cartridge has the following features.

A process cartridge that is detachably attachable to a main body of an electrophotographic apparatus,
the process cartridge comprising:
a charging device for charging a surface of an electrophotographic photosensitive member; and a developing device for developing an electrostatic latent image formed on the surface of the electrophotographic photosensitive member with a toner to form a toner image on the surface of the electrophotographic photosensitive member, wherein
the developing device comprises the toner, and
the charging device comprises a conductive member arranged to be capable of contacting the electrophotographic photosensitive member.

The above-mentioned toner and conductive member can be adopted in the process cartridge.

The process cartridge may have a frame for supporting the charging device and the developing device.

Figure 4:
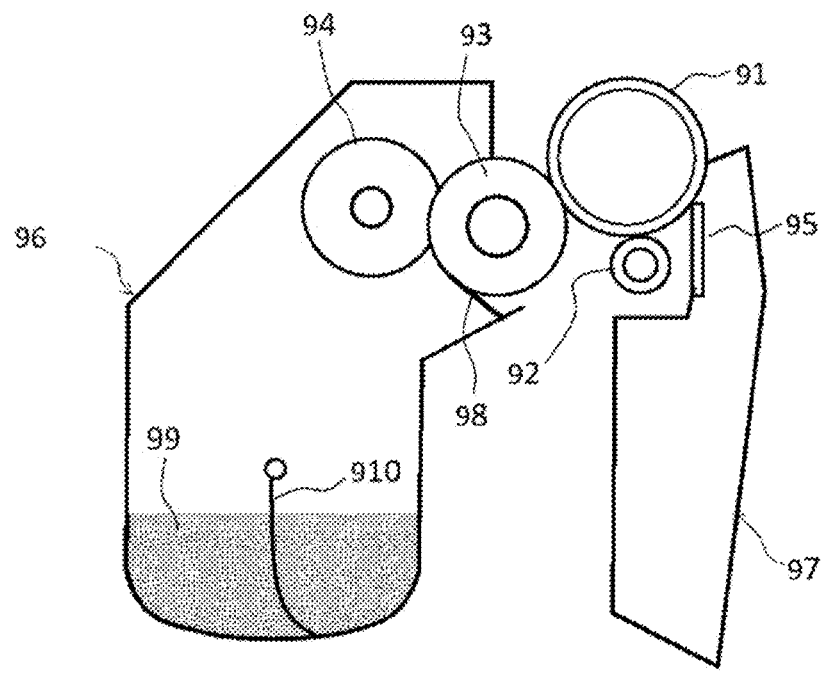
FIG. 4 is a cross-sectional schematic view of a process cartridge.

FIG. 4 is a schematic cross-sectional view of a process cartridge for electrophotography that includes a conductive member as a conductive roller. This process cartridge has a developing device and a charging device integrated with each other, and is configured to be detachably attachable to the main body of the electrophotographic apparatus.

The developing device is provided with at least a developing roller 93 and has a toner 99. In the developing device, a toner supply roller 94, a toner container 96, a developing blade 98, and a stirring blade 910 may be integrated as needed.

The charging device may include at least a conductive roller 92, and may include a cleaning blade 95 and a waste toner container 97. Since the conductive member may be disposed so as to be able to contact the electrophotographic photosensitive member, the electrophotographic photosensitive member (photosensitive drum 91) may be integrated with the charging device as a component of the process cartridge, or may be fixedly attached to the main body as a component of the electrophotographic apparatus.

A voltage is applied to each of the conductive roller 92, the developing roller 93, the toner supply roller 94, and the developing blade 98.

Cartridge Set

The cartridge set has the following features.

A cartridge set that is detachably attachable to a main body of an electrophotographic apparatus and comprises a first cartridge and a second cartridge, wherein
the first cartridge includes
a charging device for charging a surface of an electrophotographic photosensitive member, and
a first frame for supporting the charging device,
the second cartridge includes
a toner container that accommodates a toner for developing an electrostatic latent image formed on the surface of the electrophotographic photosensitive member to form a toner image on the surface of the electrophotographic photosensitive member, and
the charging device comprises a conductive member arranged to be capable of contacting the electrophotographic photosensitive member.

The above-mentioned toner and conductive member can be adopted in the cartridge set.

Since the conductive member can be placed in contact with the electrophotographic photosensitive member, the first cartridge may include the electrophotographic photosensitive member, or the electrophotographic photosensitive member may be fixedly attached to the main body of the electrophotographic apparatus. For example, the first cartridge may have an electrophotographic photosensitive member, a charging device for charging the surface of the electrophotographic photosensitive member, and a first frame member for supporting the electrophotographic photosensitive member and the charging device. The second cartridge may include an electrophotographic photosensitive member.

The first cartridge or the second cartridge may include a developing device for forming a toner image on the surface of the electrophotographic photosensitive member. The developing device may be fixedly attached to the main body of the electrophotographic apparatus.

EXAMPLES

Hereinafter, the configurations according to the present disclosure will be described in more detail with reference to Examples and Comparative Examples, but the configurations according to the present disclosure are not limited to the configurations embodied in the Examples. Further, "parts" used in Examples and Comparative Examples are based on mass unless otherwise specified.

Production Example of Conductive Member 101

1-1. Production Example of Rubber Mixture for Domain Formation (CMB)

The materials shown in Table 1 were mixed in the compounding amounts shown in Table 1 by using a 6-liter pressure kneader (trade name: TD6-15MDX, manufactured by Toshin Co., Ltd.) to obtain the CMB. The mixing conditions were a filling rate of 70% by volume, a blade rotation speed of 30 rpm, and 30 min

TABLE 1

|  | Names of raw materials | Compounding amount (parts by mass) |
|---|---|---|
| Raw material rubber | Styrene-butadiene rubber (trade name: Tufdene 1000, manufactured by Asahi Chemical Industry Co., Ltd.) | 100 |
| Electronic conductive agent | Carbon black (trade name: Toka Black #5500, manufactured by Tokai Carbon Co., Ltd.) | 80 |
| Vulcanization accelerator | Zinc oxide (trade name: Zinc White, manufactured by Sakai Chemical Industry Co., Ltd.) | 5 |
| Processing aid | Zinc stearate (trade name: SZ-2000, manufactured by Sakai Chemical Industry Co., Ltd.) | 2 |

1-2. Production Example of Matrix-Forming Rubber Mixture (MRC)

The materials shown in Table 2 were mixed in the compounding amounts shown in Table 2 by using a 6-liter pressure kneader (trade name: TD6-15MDX, manufactured by Toshin Co., Ltd.) to obtain the MRC. The mixing conditions were a filling rate of 70% by volume, a blade rotation speed of 30 rpm, and 16 min.

TABLE 2

|  | Names of raw materials | Compounding amount (parts by mass) |
|---|---|---|
| Raw material rubber | Butyl rubber (trade name: JSR Butyl 065, manufactured by JSR Co., Ltd.) | 100 |
| Filler | Calcium carbonate (trade name: Nanox #30, manufactured by Maruo Calcium Co., Ltd.) | 70 |
| Vulcanization accelerator | Zinc oxide (trade name: Zinc White, manufactured by Sakai Chemical Industry Co., Ltd.) | 7 |
| Processing aid | Zinc stearate (trade name: SZ-2000, manufactured by Sakai Chemical Industry Co., Ltd.) | 2.8 |

1-3. Production Example of Unvulcanized Rubber Mixture for Forming Conductive Layer The CMB and MRC obtained above were mixed in a compounding amount shown in Table 3 by using a 6-liter pressure kneader (trade name: TD6-15MDX, manufactured by Toshin Co., Ltd.). The mixing conditions were a filling rate of 70% by volume, a blade rotation speed of 30 rpm, and 20 min

TABLE 3

|  | Names of raw materials | Compounding amount (parts by mass) |
|---|---|---|
| Raw material rubber | Domain-forming rubber mixture (CMB) | 25 |
| Raw material rubber | Matrix-forming rubber mixture (MRC) | 75 |

Then, the vulcanizing agent and vulcanization accelerator shown in Table 4 were added in the compounding amounts shown in Table 4 to 100 parts of the mixture of CMB and MRC, and mixing was performed with an open roll having a roll diameter of 12 inches (0.30 m) to prepare a rubber mixture for forming a conductive layer.

The mixing conditions were 10 rpm for the front roll rotation and 8 rpm for the rear roll rotation, a total of 20 cuts were made on the left and right with a roll gap of 2 mm, and then thinning was performed 10 times with a roll gap of 0.5 mm.

TABLE 4

|  | Names of raw materials | Compounding amount (parts by mass) |
|---|---|---|
| Vulcanizing agent | Sulfur (trade name: Sulfax PMC, manufactured by Tsurumi Chemical Industry Co., Ltd.) | 3 |
| Vulcanization accelerator | Tetramethylthiuram disulfide (trade name Nocceler TT-P, manufactured by Ouchi Shinko Chemical Industry Co., Ltd.) | 3 |

2. Fabrication of Conductive Member 2-1. Preparation of Support Having Conductive Outer Surface A round bar having a total length of 252 mm and an outer diameter of 6 mm which was obtained by subjecting the surface of stainless steel (SUS) to electroless nickel plating was prepared as a support having a conductive outer surface.

2-2. Production Example of Conductive Layer

A die with an inner diameter of 12.5 mm was attached to the tip of a crosshead extruder having a support supply mechanism and an unvulcanized rubber roller discharge mechanism, the temperature of the extruder and the crosshead was set to 80° C., and the transport speed of the support was adjusted to 60 mm/sec. Under these conditions, the conductive layer-forming rubber mixture was supplied from the extruder, and the outer peripheral portion of the support was covered with the conductive layer-forming rubber mixture in the crosshead to obtain an unvulcanized rubber roller.

Next, the unvulcanized rubber roller was placed in a hot air vulcanizing furnace at 160° C. and heated for 60 min to vulcanize the rubber mixture for forming a conductive layer and obtain a roller in which a conductive layer was formed on the outer peripheral portion of the support. After that, both end portions of the conductive layer were cut off by 10 mm each to obtain a length of the conductive layer portion in the longitudinal direction of 232 mm 2-3. Polishing of Conductive Layer Next, the surface of the conductive layer was polished under the polishing conditions described in the Polishing Condition 1 hereinbelow to obtain a crown-shaped conductive member 101 which had a diameter of the central portion of 8.50 mm and a diameter at each position of 90 mm from the central portion to both end sides of 8.44 mm, and in which a part of each domain was exposed at the outer surface thereby creating protruded portions on the outer surface.

Polishing Condition 1

A cylindrical grindstone (manufactured by Teiken Corp.) with a diameter of 305 mm and a length of 235 mm was prepared. The types of abrasive grains, the particle diameter, the degree of bonding, the binder, and the texture (abrasive grain ratio) of the abrasive grains were as follows.

Abrasive grain material: GC (green silicon carbide), (JIS R 6111-2002).
Abrasive grain size: #80 (average grain size 177 μm, JIS B 4130)
Abrasive grain bonding degree: HH (JIS R 6210)
Binder: V4PO (Vitrified)
Abrasive grain texture (abrasive grain ratio): 23 (abrasive grain content ratio 16%, JIS R 6242)

The surface of the conductive layer was polished using the grindstone.

The polishing conditions were as follows: the rotation speed of the grindstone was 2,100 rpm, the rotation speed of the conductive member was 250 rpm, and in the coarse grinding step, the grindstone was caused to penetrate into the conductive member at a penetration speed of 20 mm/sec to a depth of 0.24 mm after contact with the outer peripheral surface of the conductive member.

In a precision polishing process, the penetration speed was changed to 0.5 mm/sec and after 0.01 mm penetration, the grindstone was separated from the conductive member to complete the polishing.

As the polishing method, an upper cut method in which the rotation directions of the grindstone and the conductive member were the same was adopted.

3. Evaluation of Characteristics 3-1. Confirmation of Matrix-Domain Structure

The formation of the matrix-domain structure in the conductive layer was confirmed by the following method.

Using a razor, a piece (thickness: 500 μm) was cut out so that a cross section orthogonal to the longitudinal direction of the conductive layer of the conductive member could be observed. Next, platinum was vapor-deposited, and a scanning electron microscope (SEM) (trade name: S-4800, manufactured by Hitachi High-Technologies Corporation) was used to capture an image at a magnification of 1,000 times to obtain a cross-sectional image.

In one embodiment, a matrix-domain structure observed in the slice from the conductive layer had a plurality of domains $6b$ dispersed in a matrix $6a$ in the cross-sectional image as shown in FIG. 2, and the domains were present independently without contacting each other. Meanwhile, the matrix was continuous in the image, and the domains were separated by the matrix.

In order to quantify the captured cross-sectional images, image processing software (trade name: ImageProPlus, manufactured by Media Cybernetics, Inc.) was used to convert the cross-sectional images obtained by SEM observation into 8-bit grayscale and obtain a monochrome image having 256 gradations. Next, after inversion processing of the black and white of the image so that the domain in the cross section became white, the threshold of binarization was set based on the algorithm of Otsu's discriminant analysis method for the luminance distribution of the image and a binarized image was obtained.

By the counting function for the binarized image, the number percentage K of isolated domains that were not connected to other domains, as described above, was calculated with respect to the total number of domains that were present in a 50 μm square area and had no contact with the frame line of the binarized image.

Specifically, in the counting function of the image processing software, the setting was made so that the domains that had contact points with the frame line of the four-direction end portions of the binarized image were not counted.

The aforementioned slices were prepared from one point randomly selected from each region obtained by equally dividing the conductive layer of the conductive member (conductive roller) into 5 parts in the longitudinal direction and equally dividing into 4 parts in the circumferential direction, that is, from a total of 20 points, and an arithmetic mean value (number %) of K when the above measurement was performed was calculated.

When the arithmetic mean value of K (number %) was 80 or more, the matrix-domain structure was evaluated as "present", and when the arithmetic mean value of K (number %) was less than 80, the evaluation was "absent".

3-2. Method for Measuring Volume Resistivity R1 of Matrix

The volume resistivity R1 of the matrix can be measured by, for example, cutting out a thin piece that has a predetermined thickness (for example, 1 μm) and includes a matrix-domain structure from the conductive layer, and bringing a microprobe of a scanning probe microscope (SPM) or an atomic force microscope (AFM) into contact with the matrix in the thin piece.

Figure 3A:
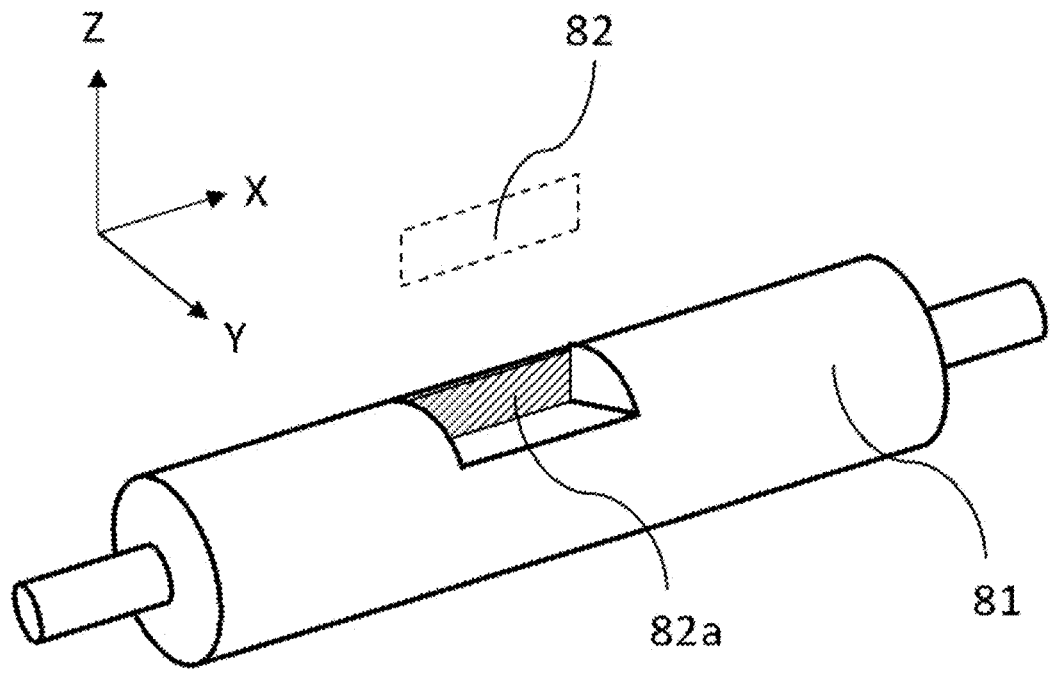
FIG. 3A is a cut-out explanatory view of the conductive member.
Figure 3B:
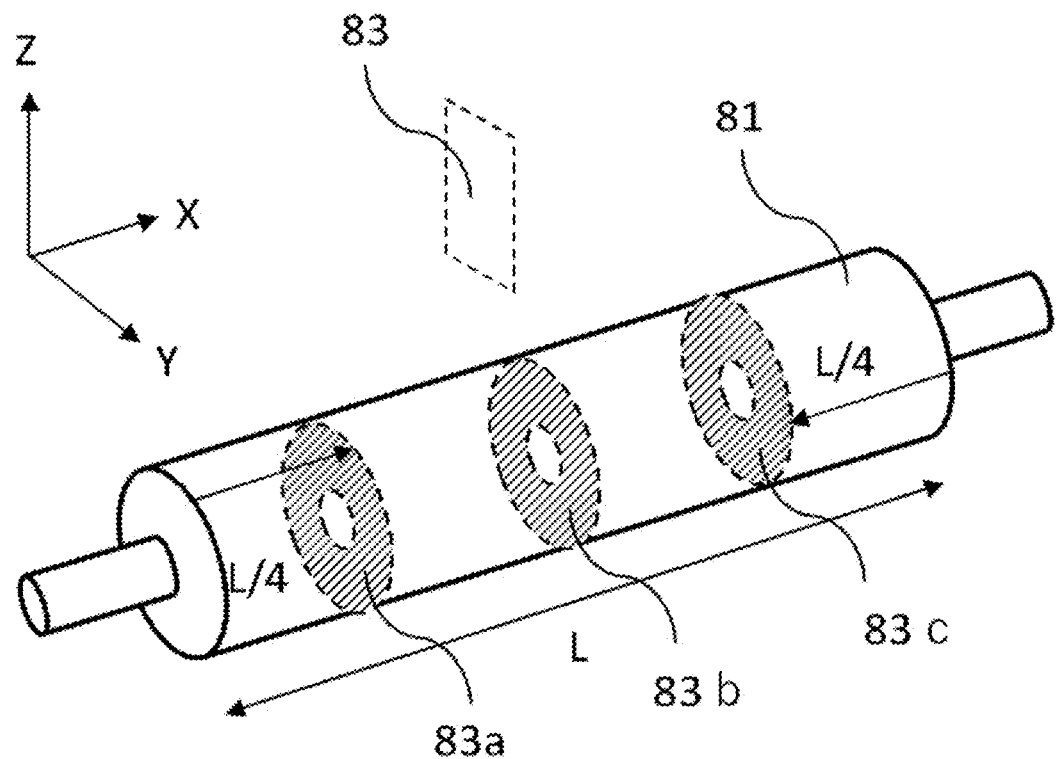
FIG. 3B is an explanatory view in a cross-section cut-out direction.

As for cutting out a thin piece from an elastic layer, for example, when the longitudinal direction of the conductive member is the X axis, the thickness direction of the conductive layer is the Z axis, and the circumferential direction is the Y axis, as shown in FIG. 3B, the thin piece is cut out so as to include at least a part of a plane parallel to the YZ plane (for example, $83a$, $83b$, $83c$) perpendicular to the axial direction of the conductive member. The cutting can be performed using, for example, a sharp razor, a microtome, or a focused ion beam method (FIB).

The volume resistivity is measured by grounding one side of a thin piece cut out from the conductive layer. Then, a microprobe of a scanning probe microscope (SPM) or an atomic force microscope (AFM) is brought into contact with the matrix portion of the surface of the thin piece opposite to the ground surface, a DC voltage of 50 V is applied for 5 sec, an arithmetic mean value is calculated from the values obtained by measuring the ground current value for 5 sec, and the applied voltage is divided by the calculated value to calculate the electrical resistance value. Finally, the resistance value is converted into volume resistivity by using the film thickness of the thin piece. At this time, SPM and AFM can measure the film thickness of the thin piece at the same time as the resistance value.

The value of the volume resistivity R1 of the matrix in the columnar charging member is obtained, for example, by cutting out a sample from each area obtained by dividing the conductive layer into 4 parts in the circumferential direction and 5 parts in the longitudinal direction, obtaining the abovementioned measurement value, and calculating the arithmetic mean value of volume resistance values for a total of 20 samples.

In this example, first, a microtome (trade name: Leica EM FCS, manufactured by Leica Microsystems Inc.) was used to cut out a 1 μm-thick thin piece from the conductive layer of the conductive member at a cutting temperature of −100° C. As shown in FIG. 3B, the thin piece was cut out so as to include at least a part of an YZ plane (for example, $83a$, $83b$, $83c$) perpendicular to the axial direction of the conductive member when the longitudinal direction of the conductive member was taken as X axis, the thickness direction of the conductive layer was taken as Z axis, and the circumferential direction was taken as Y axis.

In a temperature environment of 23° C. and a humidity of 50% RH, one surface of the thin piece (hereinafter, also referred to as "ground surface") was grounded on a metal plate, the surface (hereinafter, also referred to as "measurement surface") of the thin piece on the side opposite to the ground surface corresponded to the matrix, and a cantilever of a scanning probe microscope (SPM) (trade name: Q-Scope250, manufactured by Quesant Instrument Corporation) was brought into contact with a portion between the measurement surface and the ground surface where domains were not present. Subsequently, a voltage of 50 V was applied to the cantilever for 5 sec, the current value was measured, and the arithmetic mean value for 5 sec was calculated.

The surface shape of the measurement thin piece was observed with the SPM, and the thickness of the measurement location was calculated from the obtained height profile. Further, the area of the recess on the contact portion of the cantilever was calculated from the observation result of the surface shape. The volume resistivity was calculated from the thickness and the area of the recess.

The measurement was performed by producing a thin piece at a random location in each of parts obtained by dividing the conductive layer into 5 parts in the longitudinal direction and 4 parts in the circumferential direction, that is, producing a total of 20 thin pieces. The average value thereof was taken as the volume resistivity R1 of the matrix.

The scanning probe microscope (SPM) (trade name: Q-Scope250, made by Quesant Instrument Corporation) was operated in a contact mode.

The evaluation results are shown in Table 6 as "Volume resistivity R1 (unit: Ω·cm)" of the matrix.

3-3. Method for Measuring Volume Resistivity R2 of Domain

The volume resistivity R2 of the domains was measured by the same method as in the measurement of the volume resistivity R1 of the matrix, except that the measurement was performed at a location corresponding to the domain of an ultrathin piece and the measurement voltage was set to 1 V. In the present example, the measurement and calculation of R2 were performed in the same manner as in the above-described Method for Measuring Volume Resistivity R1 of Matrix, except that the location on the measurement surface where the cantilever was brought into contact was changed to a location which corresponded to the domain and in which the matrix was not present between the measurement surface and the ground surface, and the applied voltage at the time of measuring the current value was changed to 1 V.

The evaluation results are shown in Table 6 as "Volume resistivity R2 (unit: Ω·cm)" of the matrix.

3-4. Method for Measuring Calculated Average Value D (Domain Diameter D) of Circle-Equivalent Diameters of Domains in Conductive Layer, and Calculated Average Value Ds (Domain Diameter Ds) of Circle-Equivalent Diameters of Domains in Conductive Layer When Observing Outer Surface of Conductive Member FIGS. 3A and 3B show the shape of the conductive member 81 along three axes, specifically, three dimensions along the X, Y, and Z axes. In FIGS. 3A and 3B, the X axis indicates a direction parallel to the longitudinal direction (axial direction) of the conductive member, and the Y axis and the Z axis indicate directions perpendicular to the axial direction of the conductive member.

FIG. 3A shows an image diagram of the conductive member in which the conductive member is cut at a cross section 82a parallel to an XZ plane 82. The XZ plane can rotate 360° about the axis of the conductive member.

The calculated average value D (domain diameter D) of the circle-equivalent diameter of the domains was measured in the following manner.

A microtome (trade name: Leica EM FCS, manufactured by Leica Microsystems Inc.) was used to cut out a sample with a thickness of 1 μm that had a cross section in the thickness direction of the conductive layer as shown in FIG. 3B from three locations (83a, 83b, 83c), namely, at the center (83b) in the longitudinal direction of the conductive layer and at L/4 from both ends of the conductive layer toward the center, where L stands for the length of the conductive layer in the longitudinal direction and T stands for the thickness of the conductive layer.

Platinum was vapor-deposited on the cross section in the thickness direction of the conductive layer in each of the three obtained samples.

Then, in the platinum vapor deposition surface of each sample, images of three arbitrarily selected locations within the thickness region from the outer surface of the conductive layer to the depth of from 0.1 T to 0.9 T were captured at a magnification of 5,000 times using a scanning electron microscope (SEM) (trade name: S-4800, manufactured by Hitachi High-Technologies Corporation).

Each of the obtained nine captured images was binarized by image processing software (product name: ImagePro-Plus; manufactured by Media Cybernetics Inc.), and quantified by a counting function to calculate the arithmetic mean value S of the area of the domains included in each captured image.

Next, the circle-equivalent diameter of the domains ($=(4S/\pi)^{0.5}$) was calculated from the arithmetic mean value S of the area of the domains calculated for each captured image. Next, the calculated average value of the circle-equivalent diameters of the domains of each captured image was calculated to obtain the calculated average value D (domain diameter D) of the circle-equivalent diameters of the domains in the conductive layer in the cross-section observation of the conductive member.

The calculated average value Ds of the circle-equivalent diameters of the domains (domain diameter Ds) was measured in the following manner.

The microtome (trade name: Leica EM FCS, manufactured by Leica Microsystems Inc.) was used to cut out a sample that included the outer surface of the conductive layer from three locations, namely, at the center in the longitudinal direction of the conductive layer and at L/4 from both ends of the conductive layer toward the center. The sample had a thickness of 1 μm.

Platinum was vapor-deposited on the surface corresponding to the outer surface of the conductive layer in the samples.

Arbitrary three locations on the platinum vapor deposition surface of the sample were selected and images thereof were captured at a magnification of 5,000 using the scanning electron microscope (SEM) (trade name: S-4800, manufactured by Hitachi High-Technologies Corporation).

Each of the obtained nine captured images was binarized by image processing software (product name: ImagePro-Plus; manufactured by Media Cybernetics Inc.), and quantified by a counting function to calculate the arithmetic mean value Ss of the flat areas of the domains included in each captured image.

Next, the circle-equivalent diameter of the domains ($=(4S/\pi)^{0.5}$) was calculated from the arithmetic mean value Ss of the flat area of the domains calculated for each captured image. Next, the calculated average value of the circle-equivalent diameters of the domains of each captured image was calculated to obtain the calculated average value Ds (domain diameter Ds) of the circle-equivalent diameters of the domains in the conductive layer in the cross-section observation of the conductive member.

3-5. Method for Measuring Arithmetic Mean Value Dm (Distance Dm Between Domains) of Distance Between Adjacent Wall Surfaces of Domains in Conductive Layer in Cross-Sectional Observation of Conductive Member and Arithmetic Mean Value Dms (Distance Dms Between Domains) of Distance Between Adjacent Wall Surfaces of Domains when Observing Outer Surface of Conductive Member A sample showing a cross section in the thickness direction of the conductive layer as shown in FIG. 3B was obtained from three locations (83a, 83b, 83c), namely, at the center (83b) in the longitudinal direction of the conductive layer and at L/4 from both ends of the conductive layer toward the center, where L stands for the length of the conductive layer in the longitudinal direction and T stands for the thickness of the conductive layer.

A 50 μm quadrangular analysis area was placed at each of three randomly selected locations in the thickness region from the outer surface of the conductive layer to the depth of 0.1 T to 0.9 T in the surface showing the cross section in the thickness direction of the conductive layer, and images of the three analysis areas were captured at a magnification of 5,000 times using a scanning electron microscope (SEM) (trade name: S-4800, manufactured by Hitachi High-Technologies Corporation) for each of the three samples.

Each of a total of nine obtained images was binarized using image processing software (product name: LUZEX; manufactured by Nireco Corp.).

The binarization procedure was performed in the following manner. The captured image was converted to an 8-bit grayscale to obtain a 256-tone monochromatic image. Then, the black and white of the image were inverted so that the domain in the captured image became white, and binarization was performed to obtain a binarized image of the captured image.

Next, for each of the nine binarized images, the distance between the adjacent wall surfaces of the domains was calculated, the arithmetic mean value thereof was calculated, and this value was defined as Dm.

The distance between the adjacent wall surfaces is the shortest distance between the wall surfaces of the domains that are closest to each other, and this distance can be determined by setting a measurement parameter as the distance between the adjacent wall surfaces in the above-mentioned image processing software.

Meanwhile, a sample was cut out using a razor so as to include the outer surface of the conductive member from three locations, namely, at the center in the longitudinal direction of the conductive layer and at L/4 from both ends of the conductive layer toward the center, where L stands for the length of the conductive layer in the longitudinal direction and T stands for the thickness of the conductive layer where the length of the conductive layer in the longitudinal direction is taken as L and the thickness of the conductive layer is taken as T. The size of the sample was 2 mm in the circumferential direction and the longitudinal direction of the conductive member, and the thickness was the thickness T of the conductive member.

A 50 μm quadrangular analysis area was placed at each of three randomly selected locations on the surface corresponding to the outer surface of the conductive layer, and images of the three analysis areas were captured at a magnification of 5,000 times using a scanning electron microscope (SEM) (trade name: S-4800, manufactured by Hitachi High-Technologies Corporation) for each of the three samples.

Each of a total of nine obtained images was binarized using image processing software (product name: LUZEX; manufactured by Nireco Corp.). The binarization procedure was the same as that used when obtaining the interdomain distance Dm. Next, for each of the nine binarized images, the distance between the adjacent wall surfaces of the domains was calculated, the arithmetic mean value thereof was calculated, and this value was defined as Dms.

3-6. Method for Measuring Height of Protruded Portion

An ultrathin piece with a thickness of 1 μm was cut out at a cutting temperature of −100° C. from the conductive layer of the conductive member (conductive roller) by using a microtome (trade name: Leica EM FCS, manufactured by Leica Microsystems Inc.). The ultrathin piece was made such that a cross section orthogonal to the longitudinal direction of the conductive layer of the conductive member could be observed.

The cut-out position from the conductive layer was at three locations, namely, at the center in the longitudinal direction and at L/4 from both ends of the conductive layer toward the center, where L stands for the length of the conductive layer in the longitudinal direction.

At this time, in order to confirm the protruded portions created by the domains, care was taken so that no processing was applied to the outer surface of the conductive member. Next, the electric resistance profile and shape profile of the obtained ultrathin piece including the outer surface of the conductive member were measured by measuring the outer surface of the conductive member under the following conditions by using a scanning probe microscope (SPM; MFP-3D-Origin, manufactured by Oxford Instruments Co., Ltd.).

Measurement mode: AM-FM mode
Tip: Olympus OMCL-AC160TS
Resonance frequency: 251.825 kHz to 261.08 kHz
Spring constant: 23.59 N/m to 25.18 N/m
Scan speed: 0.8 Hz to 1.5 Hz
Scan size: 10 μm, 5 μm, 3 μm
Target Amplitude: 3 V and 4 V
Set Point: all 2 V Next, it was confirmed that the protruded portions in the surface shape profile obtained by the above measurement were derived from the domains having higher conductivity than the surrounding area in the electric resistance value profile.

Then, the height of the protruded portions was calculated from the shape profile.

In the calculation method, the difference between the arithmetic mean value of the shape profile of the protruded portions created by the domains and the arithmetic mean value of the shape profile of the adjacent matrix was found. The arithmetic mean value was calculated from the values obtained by measuring 20 randomly selected protruded portions in each of the ultrathin pieces cut out from the above three locations. The results are shown in Table 6 as the "Height of protruded portion" of the domain.

Production Examples of Conductive Members 102 to 111

The conductive members 102 to 111 were produced is the same manner as the conductive member 101 except that the materials and conditions shown in Tables 5A-1 and 5A-2 were used for the raw material rubber, electronic conductive agent, vulcanizing agent, and vulcanization accelerator.

As for the details of the materials shown in Tables 5A-1 and 5A-2, refer to Table 5B-1 for the raw material rubber, Table 5B-2 for the electronic conductive agent, and Table 5B-3 for the vulcanizing agent and vulcanization accelerator. The polishing conditions 2 to 4 shown in Table 5A-2 are as follows.

Polishing Condition 2
Same as the polishing condition 1 except that the penetration speed in the precision polishing process was set to 0.5 mm/sec.

Polishing Condition 3
Same as the polishing condition 1 except that the penetration speed in the precision polishing process was set to 0.1 mm/sec.

Polishing Condition 4

Same as the polishing condition 1, except that the penetration speed in the precision polishing process was changed to 0.1 mm/sec, and after the penetration to a depth of 0.01 mm, the polishing was continued for 4 sec.

TABLE 5A-1

| Conductive member No. | Conductive support | | Domain-forming rubber mixture (CMB) | | | | | | | |
|---|---|---|---|---|---|---|---|---|---|---|
| | | | Raw material rubber | | | Electronic conductive agent | | | Dispersion | |
| | Type | Support surface | Abbreviated material name | SP value | Mooney viscosity | Type | Parts by mass | DBP | time min | Mooney viscosity |
| 101 | SUS | Ni-plated | SBR T1000 | 16.8 | 45 | #5500 | 60 | 155 | 30 | 84 |
| 102 | SUS | Ni-plated | Butyl JSR Butyl 065 | 15.8 | 32 | #5500 | 65 | 155 | 30 | 93 |
| 103 | SUS | Ni-plated | NBR N230SV | 20.0 | 32 | #7360 | 50 | 87 | 30 | 57 |
| 104 | SUS | Ni-plated | Butyl JSR Butyl 065 | 15.8 | 32 | #5500 | 65 | 155 | 30 | 93 |
| 105 | SUS | Ni-plated | SBR T1000 | 16.8 | 45 | #7360 | 40 | 87 | 60 | 65 |
| 106 | SUS | Ni-plated | SBR T1000 | 16.8 | 45 | #7360 | 38 | 87 | 80 | 60 |
| 107 | SUS | Ni-plated | NBR N230SV | 20.0 | 32 | #7360 | 70 | 87 | 30 | 90 |
| 108 | SUS | Ni-plated | SBR T1000 | 16.8 | 45 | #5500 | 60 | 155 | 30 | 84 |
| 109 | SUS | Ni-plated | SBR T1000 | 16.8 | 45 | #5500 | 60 | 155 | 30 | 84 |
| 110 | SUS | Ni-plated | NBR N202S | 20.4 | 57 | #7360 | 60 | 87 | 30 | 86 |
| 111 | SUS | Ni-plated | NBR N230S | 20.0 | 32 | #7360 | 60 | 87 | 30 | 68 |
| 201 | SUS | Ni-plated | NBR N230SV | 19.2 | 32 | LV | 3 | — | 30 | 35 |
| 202 | SUS | Ni-plated | NBR N230SV | 19.2 | 32 | Ketjen | 10 | 360 | 30 | 50 |
| 203 | SUS | Ni-plated | Butyl JSR Butyl 065 | 15.8 | 32 | #5500 | 50 | 155 | 30 | 75 |

In the table,

DBP represents DBP oil absorption, and the unit is $(cm^3/100\ g)$. Regarding the Mooney viscosity in the table, the raw rubber values are the catalog values of each company. The CMB value is the Mooney viscosity ML (1+4) based on JIS K 6300-1:2013, and was measured at the rubber temperature when all the materials constituting the CMB were kneaded.

The unit of the SP value is $(J/cm^3)^{0.5}$.

TABLE 5A-2

| Conductive member No. | Matrix-forming rubber mixture (MRC) | | | Electronic conductive agent | | Unvulcanized rubber mixture | | Dispersion conditions | | Vulcanizing agent | | Vulcanization accelerator | | Polishing condition |
|---|---|---|---|---|---|---|---|---|---|---|---|---|---|---|
| | Raw material rubber | | | | | CMB Parts by mass | MCR Parts by mass | Rotation speed rpm | Kneading time min | Abbreviated material name | Parts by mass | Abbreviated material name | Parts by mass | |
| | Abbreviated material name | SP value | Mooney viscosity | Type | Parts by mass | Mooney viscosity | | | | | | | | |
| 101 | Butyl JSR Butyl 065 | 15.8 | 32 | — | — | 40 | 25 | 75 | 30 | 20 | Sulfur | 3 | TT | 3 | 1 |
| 102 | SBR T2003 | 17.0 | 33 | — | — | 52 | 24 | 76 | 30 | 20 | Sulfur | 2 | TT | 2 | 1 |
| 103 | SBR T1000 | 16.8 | 45 | — | — | 51 | 25 | 75 | 30 | 20 | Sulfur | 3 | TBZTD | 1 | 1 |
| 104 | BR T0700 | 17.1 | 43 | — | — | 53 | 21 | 79 | 30 | 20 | Sulfur | 3 | TT | 3 | 1 |
| 105 | SBR A303 | 17.0 | 46 | — | — | 52 | 22 | 78 | 30 | 20 | Sulfur | 2 | TT | 2 | 1 |
| 106 | SBR A303 | 17.0 | 46 | — | — | 52 | 22 | 78 | 30 | 20 | Sulfur | 2 | TT | 2 | 1 |
| 107 | EPDM Esplene505A | 16.0 | 47 | — | — | 52 | 25 | 75 | 30 | 20 | Sulfur | 3 | TET | 1 | 1 |
| 108 | Butyl JSR Butyl 065 | 15.8 | 32 | — | — | 40 | 25 | 75 | 30 | 20 | Sulfur | 3 | TT | 3 | 2 |
| 109 | Butyl JSR Butyl 065 | 15.8 | 32 | — | — | 40 | 25 | 75 | 30 | 20 | Sulfur | 3 | TT | 3 | 3 |
| 110 | EPDM Esplene505A | 16.0 | 47 | — | — | 52 | 25 | 75 | 30 | 5 | Sulfur | 3 | TET | 3 | 1 |
| 111 | EPDM Esplene505A | 16.0 | 47 | — | — | 52 | 25 | 75 | 30 | 20 | Sulfur | 3 | TET | 3 | 1 |
| 201 | — | — | — | — | — | — | 100 | 0 | — | — | Sulfur | 3 | TBZTD | 1 | 4 |
| 202 | ECO CG103 | 18.5 | 64 | LV | 3 | 68 | 80 | 20 | 20 | 20 | Sulfur | 3 | TBZTD | 1 | 4 |
| 203 | ECO CG103 | 18.5 | 64 | — | — | 68 | 20 | 80 | 20 | 20 | Sulfur | 3 | TBZTD | 1 | 4 |

Regarding the Mooney viscosity in the table, the raw rubber values are the catalog values of each company. The MRC value is the Mooney viscosity ML (1+4) based on JIS K 6300-1:2013, and was measured at the rubber temperature when all the materials constituting the MRC were kneaded.

The unit of the SP value is $(J/cm^3)^{0.5}$.

TABLE 5B-1

| Abbreviated material name | Material name | Product name | Manufacturer name |
|---|---|---|---|
| Butyl | Butyl065 | Butyl rubber | JSR Butyl 065 | JSR Corp. |
| BR | T0700 | Polybutadiene rubber | JSR T0700 | JSR Corp. |
| ECO | CG103 | Epichlorohydrin rubber | Epichlomer CG103 | Osaka Soda Co., Ltd. |
| EPDM | Esplene301A | Ethylene-propylene-diene rubber | Esprene301A | Sumitomo Chemical Co., Ltd. |
| EPDM | Esplene505A | Ethylene-propylene-diene rubber | Esprene505A | Sumitomo Chemical Co., Ltd. |
| NBR | N230SV | Acrylonitrile butadiene rubber | NBR N230SV | JSR Corp. |
| NBR | N230S | Acrylonitrile butadiene rubber | NBR N230S | JSR Corp. |
| NBR | N202S | Acrylonitrile butadiene rubber | NBR N202S | JSR Corp. |
| SBR | T1000 | Styrene butadiene rubber | Tufdene1000 | Asahi Chemical Industry Co., Ltd. |
| SBR | T2003 | Styrene butadiene rubber | Tufdene2003 | Asahi Chemical Industry Co., Ltd. |
| SBR | A303 | Styrene butadiene rubber | Asaprene 303 | Asahi Chemical Industry Co., Ltd. |

TABLE 5B-2

| Abbreviated material name | Material name | Product name | Manufacturer Name |
|---|---|---|---|
| #7360 | Conductive carbon black | Toka Black #7360SB | Tokai Carbon Co., Ltd. |
| #5500 | Conductive carbon black | Toka Black #5500 | Tokai Carbon Co., Ltd. |
| Ketjen | Conductive carbon black | Carbon ECP | Lion Specialty Chemicals Co., Ltd. |
| LV | Ionic conductor | LV70 | ADEKA Corp. |

TABLE 5B-3

| Abbreviated material name | Material name | Product name | Manufacturer Name |
|---|---|---|---|
| Sulfur | Sulfur | Sulfax PMC | Tsurumi Chemical Industry Co., Ltd. |
| TT | Tetramethylthiuram disulfide | Nocceler TT-P | Ouchi Shinko Chemical Industry Co., Ltd. |
| TBZTD | Tetrabenzylthiuram disulfide | Sanceler TBZTD | Sanshin Chemical Industry Co., Ltd. |
| TET | Tetraethylthiuram disulfide | Sanceler TET-G | Sanshin Chemical Industry Co., Ltd. |

TABLE 6

| | | Characteristic evaluation of matrix-domain structure | | | | | | |
|---|---|---|---|---|---|---|---|---|
| | Presence/ | Matrix | | | Domain | | | |
| Electro conductive member No. | absence of matrix-domain structure | Volume resistivity R1 $\Omega \cdot cm$ | Interdomain distance on outer surface Dms $\mu m$ | Interdomain distance in cross section Dm $\mu m$ | Volume resistivity R2 $\Omega \cdot cm$ | R1/R2 — | Domain diameter D $\mu m$ | Height of protruded portion nm |
| 101 | Present | $5.83 \times 10^{16}$ | 0.25 | 0.22 | $1.66 \times 10^1$ | $3.5 \times 10^{15}$ | 0.20 | 184 |
| 102 | Present | $2.62 \times 10^{12}$ | 1.33 | 1.22 | $6.23 \times 10^1$ | $4.2 \times 10^{10}$ | 1.20 | 199 |
| 103 | Present | $1.75 \times 10^{12}$ | 4.75 | 4.65 | $4.58 \times 10^3$ | $3.8 \times 10^8$ | 4.65 | 100 |
| 104 | Present | $7.00 \times 10^{14}$ | 1.23 | 1.12 | $2.17 \times 10^1$ | $3.2 \times 10^{14}$ | 1.12 | 178 |
| 105 | Present | $2.08 \times 10^{12}$ | 0.45 | 0.44 | $3.14 \times 10^5$ | $6.6 \times 10^6$ | 1.84 | 154 |
| 106 | Present | $2.09 \times 10^{12}$ | 0.45 | 0.44 | $3.08 \times 10^6$ | $6.8 \times 10^5$ | 1.78 | 168 |
| 107 | Present | $2.01 \times 10^{15}$ | 4.69 | 4.55 | $5.47 \times 10^1$ | $3.0 \times 10^{15}$ | 4.55 | 184 |

TABLE 6-continued

| | | Characteristic evaluation of matrix-domain structure | | | | | | |
|---|---|---|---|---|---|---|---|---|
| | Presence/ | Matrix | | | Domain | | | |
| Electro conductive member No. | absence of matrix-domain structure | Volume resistivity R1 $\Omega \cdot cm$ | Interdomain distance on outer surface Dms $\mu m$ | Interdomain distance in cross section Dm $\mu m$ | Volume resistivity R2 $\Omega \cdot cm$ | R1/R2 — | Domain diameter D $\mu m$ | Height of protruded portion nm |
| 108 | Present | $3.92 \times 10^{16}$ | 0.23 | 0.21 | $1.32 \times 10^1$ | $3.0 \times 10^{15}$ | 0.21 | 90 |
| 109 | Present | $1.08 \times 10^{16}$ | 0.22 | 0.23 | $3.12 \times 10^1$ | $3.5 \times 10^{14}$ | 0.23 | 18 |
| 110 | Present | $6.21 \times 10^{15}$ | 6.84 | 6.80 | $5.87 \times 10^1$ | $2.3 \times 10^{14}$ | 5.65 | 124 |
| 111 | Present | $4.90 \times 10^{15}$ | 6.01 | 5.55 | $2.14 \times 10^1$ | $1.1 \times 10^{14}$ | 5.50 | 75 |
| 201 | Absent | — | — | — | — | — | — | — |
| 202 | Present | $1.44 \times 10^7$ | 0.57 | 0.56 | $1.25 \times 10^1$ | $1.2 \times 10^6$ | 1.20 | 42 |
| 203 | Present | $6.45 \times 10^7$ | 1.06 | 1.04 | $3.22 \times 10^3$ | $2.0 \times 10^4$ | 1.42 | 57 |

Conductive Member 201

A conductive member 201 (conductive support C1) was produced in the same manner as the conductive member 101 except that the materials and conditions shown in Table 5A-1 and Table 5A-2 were used.

Next, according to the following method, a conductive resin layer was further provided on the conductive support C1 to produce the conductive member 201, and the same measurement and evaluation as in Example 1 were performed. The results are shown in Table 6.

First, methyl isobutyl ketone was added as a solvent to a caprolactone-modified acrylic polyol solution to adjust the solid content to 10% by mass. For 1,000 parts of this acrylic polyol solution (100 parts of solid content), a mixed solution was prepared using the materials shown in Table 7 below. At this time, the mixture of the block HDI and the block IPDI was "NCO/OH=1.0".

TABLE 7

| | Names of raw materials | |
|---|---|---|
| Main agent | Caprolactone-modified acrylic polyol solution (solid content: 70%) (trade name: PLACCEL DC2016, manufactured by Daicel Chemical Industries, Ltd.) | 100 (Solid content) |
| Curing agent 1 | Block isocyanate A (IPDI, solid content: 60%) (trade name: VESTANAT B1370, manufactured by Degussa Japan Co., Ltd.) | 37 (Solid content) |
| Curing agent 2 | Block isocyanate B (HDI, solid content: 80%) (trade name: DURANATETPA-B80E, manufactured by Asahi Kasei Chemicals Corp.) | 24 (Solid content) |
| Conductive agent | Carbon black (HAF) (trade name: Seast3, manufactured by Tokai Carbon Co., Ltd.) | 15 |
| Additive 1 | Needle-shaped rutile-type titanium oxide fine particles (trade name: MT-100T, manufactured by Tayca Corp.) | 35 |
| Additive 2 | Modified dimethylsilicone oil (trade name: SH28PA manufactured by Toray Dow Corning Silicone Co., Ltd.) | 0.1 |

Then, 210 parts of the mixed solution and 200 parts of glass beads having an average particle diameter of 0.8 mm as media were mixed in a 450 mL glass bottle and pre-dispersed for 24 h using a paint shaker disperser to obtain a coating material for forming a conductive resin layer.

The conductive support C1 was coated by a dipping method by dipping in the coating material for forming a conductive resin layer with the longitudinal direction of the support being the vertical direction. The dipping coating immersion time was 9 sec, the initial pull-up speed was 20 mm/sec, the final pull-up speed was 2 mm/sec, and in this process, the speed was changed linearly with time. The obtained coated product was air-dried at room temperature for 30 min, then dried for 1 h in a hot-air circulation dryer set at 90° C., and further dried for 1 h in a hot-air circulation dryer set at 160° C. to obtain the conductive member 201.

In the conductive member 201, the conductive layer is configured to have only a single layer made of a conductive material, and thus has a single conductive path as the conductive member.

Conductive Member 202 and Conductive Member 203

Conductive member 202 and conductive member 203 were produced in the same manner as conductive member 101 and the same measurement and evaluation as those of the conductive member 101 were performed except that the materials and conditions shown in Table 5A-1 and Table 5A-2 were used. The results are shown in Table 6.

The conductive member 202 and the conductive member 203 have domains and a matrix, but the volume resistivity R1 of the matrix is small, and as a result, the conductive member is configured to have a single conductive path.

Production Example of Silica Fine Particles 101

A silica fine particle raw material (fumed silica; the number-average particle diameter of primary particles [represented as D1 in the table] is 20 nm) was put into an autoclave equipped with a stirrer, and heated to 200° C. in a fluidized state created by stirring.

The inside of the autoclave was replaced with nitrogen gas and hermetically sealed, and 10 parts of hexamethyldisilazane (HMDS) was sprayed inside 100 parts of the silica fine particle base material to obtain the fluidized state of the fine particles and perform surface treatment with a silane compound. After the reaction was continued for 60 min, the reaction was completed. After completion of the reaction, the autoclave was depressurized and washed with a nitrogen gas stream to remove excess hexamethyldisilazane and byproducts from the hydrophobized silica fine particles.

Further, while stirring the hydrophobized silica fine particles in the autoclave, dimethyl silicone oil (viscosity 100 mm²/sec, that is, 100 cSt) was sprayed in an amount of 17 parts with respect to 100 parts of the silica fine particle raw material, and stirring was continued for 30 min. The temperature was then raised to 300° C. under stirring, and stirring was performed for 2 h. The product was taken out and pulverized to obtain silica fine particles 101. The physical properties are shown in Table 8.

Production Example of Silica and Fine Particles 102 and 103

Silica fine particles 102 103 were obtained in the same manner as in the production example of silica fine particles 101, except that the number-average particle diameter (and specific surface area) of the primary particles of the silica fine particle raw material to be used and the hydrophobizing treatment conditions were changed as shown in Table 8, and a pulverizing treatment strength was adjusted as appropriate. The physical properties are shown in Table 8.

Silica Fine Particles 104

A total of 500 parts of methanol and 70 parts of water adjusted to a pH of 7.4 by using 10% by mass aqueous ammonia were added and mixed in a 1.5 L glass reaction vessel equipped with a stirrer, a dropping nozzle, and a thermometer to obtain a catalyst solution.

After adjusting this alkaline catalyst solution to 50° C., 100 parts of tetramethoxysilane (TMOS), 20 parts of dimethylformamide, and 20 parts of 1.0% by mass aqueous ammonia were simultaneously added dropwise over 45 min while stirring to obtain a hydrophilic silica particle-dispersed solution.

After that, the obtained silica particle-dispersed solution was concentrated to a solid content concentration of 40% by mass with a rotary filter R-fine (manufactured by Kotobuki Kogyo Co., Ltd.) to obtain a silica particle-dispersed solution. The silica particle-dispersed solution was sufficiently dried at 80° C. under reduced pressure to obtain untreated silica fine particles (raw body).

A total of 250 parts of the untreated silica fine particles were placed in a reaction vessel, and a solution prepared by diluting 50 parts of silicone oil (1,000 cSt) with 20 parts of normal hexane was sprayed under a nitrogen atmosphere while stirring. Then, this mixture was stirred at 300° C. for 60 min in a nitrogen gas stream, dried, and cooled to obtain oil-treated silica fine particles.

Then, 40 parts of hexamethyldisilazane (HMDS) was sprayed inside 100 parts of the oil-treated silica fine particles to obtain the fluidized state of the fine particles and perform surface treatment with a silane compound. After the reaction was continued for 60 min, the reaction was completed. After completion of the reaction, the autoclave was depressurized and washed with a nitrogen gas stream to remove excess hexamethyldisilazane and byproducts from the hydrophobized silica fine particles and obtain silica fine particles 104. The physical properties are shown in Table 8.

Production Example of Silica Fine Particles 105

A total of 500 parts of methanol and 70 parts of water adjusted to a pH of 7.4 by using 10% by mass aqueous ammonia were added and mixed in a 1.5 L glass reaction vessel equipped with a stirrer, a dropping nozzle, and a thermometer to obtain a catalyst solution.

After adjusting this alkaline catalyst solution to 50° C., 100 parts of tetramethoxysilane (TMOS), 20 parts of dimethylformamide, and 20 parts of 1.0% by mass aqueous ammonia were simultaneously added dropwise over 45 min while stirring to obtain a hydrophilic silica particle-dispersed solution.

After that, the obtained silica particle-dispersed solution was concentrated to a solid content concentration of 40% by mass with a rotary filter R-fine (manufactured by Kotobuki Kogyo Co., Ltd.) to obtain a silica particle-dispersed solution.

A total of 40 parts of hexamethyldisilazane (HMDS) as a hydrophobizing agent was added to 250 parts of the silica particle-dispersed solution, the reaction was conducted at 130° C. for 2 h, followed by cooling and then drying by spray drying to obtain silica fine particles 105. The physical properties are shown in Table 8.

TABLE 8

| Silica fine particle No. | Raw body D1 nm | BET specific surface area of raw body m²/g | Number of parts of silicone oil used for treatment parts by mass | Silicone oil viscosity cSt | Number of parts of HMDS used for treatment parts by mass | Volume resistivity Ω · cm |
|---|---|---|---|---|---|---|
| 101 | 20 | 100 | 17 | 100 | 10 | $5.31 \times 10^{14}$ |
| 102 | 7 | 330 | 30 | 100 | 10 | $6.27 \times 10^{14}$ |
| 103 | 40 | 60 | 30 | 100 | 10 | $5.46 \times 10^{14}$ |
| 104 | 39 | 149 | 50 | 1000 | 40 | $7.28 \times 10^{10}$ |
| 105 | 39 | 149 | — | — | 40 | $9.50 \times 10^{10}$ |

Production Example of Magnetic Bodies 1

A caustic soda solution in an equivalent of from 1.00 to 1.10 with respect to iron element, $P_2O_5$ with an amount of 0.12% by mass, in terms of phosphorus element, with respect to iron element, and $SiO_2$ in an amount of 0.60% by mass, in terms of silicon element, were mixed in a ferrous sulfate aqueous solution. An aqueous solution including ferrous hydroxide was thus prepared. The pH of the aqueous solution was adjusted to 8.0, and an oxidation reaction was performed at 85° C. while blowing air to prepare a slurry liquid having seed crystals.

Next, an aqueous ferrous sulfate solution was added to the slurry liquid in an equivalent of from 0.90 to 1.20 with respect to the initial alkali amount (sodium component of caustic soda). Thereafter, the pH of the slurry liquid was maintained at 7.6, and the oxidation reaction was advanced while blowing air to obtain a slurry liquid including magnetic iron oxide. After filtration and washing, this water-containing slurry liquid was taken out. At this time, a small amount of a water-containing sample was collected and the water content was measured.

Next, this water-containing sample was put into another aqueous medium without drying, stirred and re-dispersed with a pin mill type fine pulverizer while circulating the slurry, and the pH of the re-dispersion liquid was adjusted to about 4.8.

Then, 1.7 parts of an n-hexyltrimethoxysilane coupling agent was added to 100 parts of magnetic iron oxide (the amount of magnetic iron oxide was calculated as a value obtained by subtracting the water content from the water-containing sample) under stirring, and hydrolysis was performed. After that, sufficient stirring was performed to adjust the pH of the dispersion liquid to 8.6, and surface treatment was performed. The produced hydrophobic magnetic bodies were filtered with a filter press, washed with a large amount of water, and dried at 100° C. for 15 min and at 90° C. for 30 min, and the obtained particles were pulverized to obtain magnetic bodies 1 having a volume average particle diameter of 0.23 μm.

Production Example of Polyester Resin 1

The following components were placed in a reaction tank equipped with a cooling pipe, a stirrer, and a nitrogen introduction pipe, and were reacted at 230° C. for 10 h while distilling off water produced under a nitrogen stream.

| | |
|---|---|
| Bisphenol A propylene oxide 2 mol adduct | 75 parts |
| Bisphenol A propylene oxide 3 mol adduct | 25 parts |
| Terephthalic acid | 110 parts |
| Titanium-based catalyst | 0.25 parts |
| (Titanium dihydroxybis(triethanolaminate)) | |

Then, the mixture was reacted under a reduced pressure of from 5 mmHg to 20 mmHg and cooled to 180° C. when the acid value became 2 mg KOH/g or less, 8 parts of trimellitic acid anhydride was added, and the reaction was carried out for 2 h at room temperature, The product was then taken out, cooled to room temperature and then pulverized to obtain a polyester resin 1.

Production Example of Toner Particles 101

A total of 450 parts of 0.1 mol/L-Na$_3$PO$_4$ aqueous solution was added to 720 parts by mass of ion-exchanged water and heated to 60° C., and then 67.7 parts of 1.0 mol/L-CaCl$_2$ aqueous solution was added to obtain an aqueous medium including a dispersion stabilizer.

| | |
|---|---|
| Styrene | 78.0 parts |
| n-Butyl acrylate | 22.0 parts |
| Divinylbenzene | 0.6 part |
| Iron complex of monoazo dye (T-77: Hodogaya Chemical Co., Ltd.) | 2.0 parts |
| Magnetic bodies 1 | 90.0 parts |
| Polyester resin 1 | 3.0 parts |

The above formulation was uniformly dispersed and mixed using an attritor (Mitsui Miike Kakoki Co., Ltd.) to obtain a polymerizable monomer composition. The obtained polymerizable monomer composition was heated to 60° C., and 15.0 parts of paraffin wax (melting point: 78° C.) and 15.0 parts of ester wax (melting point: 72° C.) were added and mixed. After the waxes were dissolved, 7.0 parts of dilauroyl peroxide as a polymerization initiator was dissolved to obtain a polymerizable monomer composition including a toner composition.

The polymerizable monomer composition including the toner composition was put into the aqueous medium, stirred and granulated at 12,500 rpm for 12 min at 60° C. in a nitrogen atmosphere with a TK homomixer (Tokushu Kika Kogyo Co., Ltd.). Then, the mixture was reacted at 74° C. for 6 h while stirring with a paddle stirring blade.

After the reaction was completed, the suspension was cooled, hydrochloric acid was added to the suspension, and the suspension was filtered and dried to obtain toner particles 1. The toner particles 1 thus obtained had a number-average particle diameter of 7.7 μm and a softening point of 130.3° C.

Production Example of Toner Particles 102

Toner particles 102 were obtained in the same manner as in the production example of the toner particles 101, except that 15.0 parts of paraffin wax (melting point: 78° C.) and 15.0 parts of ester wax (melting point: 72° C.) were changed to only 15.0 parts of paraffin wax (melting point: 78° C.). The toner particles 102 thus obtained had a number-average particle diameter of 7.7 μm and a softening point of 135.8° C.

Production Example of Toner 101

The silica fine particles 101 were externally added and mixed by the Henschel mixer "FM10C (manufactured by Nippon Coke Industry Co., Ltd.)" in an amount of 2.0 parts with respect to 100 parts of the obtained toner particles 1.

External mixing conditions were as follows: charged amount of toner particles: 1.8 kg, rotation speed: 3,600 rpm, external addition time: 30 min After that, a toner 101 was obtained by sieving with a mesh having an opening of 200 μm. The physical properties of the toner 101 are shown in Table 9.

Production Examples of Toners 102 to 108 and Toner 201

Toners 102 to 108 and 201 were obtained in the same manner as in the production example of toner 101 except that the formulations and production conditions shown in Table 9 were used. The physical properties of the toners 102 to 108 and 201 thus obtained are shown in Table 9.

Method for Measuring Coverage Ratio of Toner Particle with Silica Fine Particles The coverage ratio of toner surface with silica fine particles was calculated as follows.

Elemental analysis of the toner surface was performed using the following equipment under the following conditions.

Measuring device (X-ray photoelectron spectroscopy): Quantum 2000 (trade name, manufactured by ULVAC-PHI, Inc.)

X-ray source: monochromatic AlKα

Xray Setting: 100 μmφ (25 W (15 kV))

Photoelectron take-off angle: 45 degrees

Neutralization condition: neutralizing gun and ion gun used together

Analysis area: 300×200 μm

Pass Energy: 58.70 eV

Step size: 1.25 eV

Analysis software: Maltipak (PHI)

Here, the peaks of C1c (B. E. from 280 eV to 295 eV), O1s (B. E. from 525 eV to 540 eV), and Si2p (B. E. from 95 eV to 113 eV) were used to calculate the quantitative value of Si atoms. The quantitative value of the Si element obtained here was taken as Y1.

Next, elemental analysis of silica fine particles alone was performed in the same manner as the above-described elemental analysis of the toner surface, and the quantitative value of the Si element obtained here was taken as Y2.

The coverage ratio of the toner surface with the silica fine particles was defined by the following formula using the Y1 and Y2.

Coverage ratio(% by area)=$Y1/Y2\times100$

The Y1 and Y2 were measured twice or more to improve the accuracy of this measurement.

When obtaining the quantitative value Y2, where the silica fine particles used for external addition are available, the measurement is performed using these particles. When the silica fine particles separated from the toner surface are used as the measurement sample, the silica fine particles are separated from the toner particles by the following procedure. The same applies when other physical properties of the silica fine particles are measured.

(1) Magnetic Toner

First, 6 mL of Contaminon N (10% by mass aqueous solution of a neutral detergent for cleaning precision measuring instruments which is composed of a nonionic surfactant, an anionic surfactant, and an organic builder and has pH 7; manufactured by Wako Pure Chemical Industries, Ltd.) was placed in 100 mL of ion-exchanged water to prepare a dispersion medium. To this dispersion medium, 5 g of toner was added and dispersed by an ultrasonic disperser for 5 min The resulting dispersion was set in "KM Shaker" (model: V. SX) manufactured by Iwaki Sangyo Co., Ltd. and shaken for 20 min under the condition of 350 reciprocations per minute.

After that, the neodymium magnet was used to restrain the toner particles and a supernatant was collected. By drying this supernatant, silica fine particles were collected. When it was not possible to collect a sufficient amount of silica fine particles, this operation was repeated.

In this method, where an external additive other than silica fine particles is added, the external additive other than silica fine particles is also collected. In such a case, the silica fine particles may be selected from the collected external additive by using a centrifugal separation method or the like.

(2) Non-magnetic Toner

A total of 160 g of sucrose (manufactured by Kishida Chemical Co., Ltd.) was added to 100 mL of ion-exchanged water, and dissolved with a hot water bath to prepare a concentrated sucrose solution. A total of 31 g of the concentrated sucrose solution and 6 mL of Contaminon N were placed in a centrifuge tube to prepare a dispersion liquid. To this dispersion liquid, 1 g of toner was added, and a lump of toner was loosened with a spatula or the like.

The centrifuge tube was shaken in the above shaker for 20 min under the condition of 350 reciprocations per minute. After shaking, the solution was transferred into a glass tube for a swing rotor (50 mL), and centrifugal separation was performed with a centrifuge under the conditions of 3,500 rpm and 30 min.

In the glass tube after centrifugation, the toner was present in the uppermost layer and the silica fine particles were present on the aqueous solution side of the lower layer. The aqueous solution of the lower layer was collected and centrifuged to separate sucrose and silica fine particles, and the silica fine particles were collected. The centrifugation was repeated as necessary, and after sufficient separation, the dispersion was dried and silica fine particles were collected.

Where an external additive other than silica fine particles is added, the external additive other than silica fine particles is also collected in the same manner as in the case of magnetic toner. Therefore, the silica fine particles may be selected from the collected external additive by using a centrifugal separation method or the like.

Method for Measuring Softening Point

The softening point was measured using a constant-load extrusion-type capillary rheometer "Flow characteristic evaluation device Flow Tester CFT-500D" (manufactured by Shimadzu Corporation) according to the manual provided with the device.

In this device, the temperature of a measurement sample filled in a cylinder is raised and the sample is melted while applying a constant load from the top of the measurement sample with a piston, the melted measurement sample is extruded from a die at the bottom of the cylinder, and a flow curve showing the relationship between a piston drop amount and temperature at this time can be obtained.

"A melting temperature in a ½ method" described in the manual provided with the "Flow characteristic evaluation device Flow Tester CFT-500D" was taken as the softening point. A melting temperature in a ½ method was calculated as follows.

First, a half of the difference between a piston drop amount Smax at the time when the outflow ends and a piston drop amount Smin at the time when the outflow starts is obtained (this is denoted by X. X=(Smax−Smin)/2). The temperature at the flow curve when the piston drop amount in the flow curve is the sum of X and Smin is the melting temperature in the ½ method.

About 1.0 g of a sample was compression molded under a pressure of about 10 MPa for about 60 sec by using a tablet molding compressor (NT-100H, manufactured by NPA System Co., Ltd.) in an environment of 25° C. to obtain a columnar measurement sample having a diameter of about 8 mm.

The measurement conditions of CFT-500D are as follows.
Test mode: temperature rise method
Temperature rising rate: 4° C./min
Starting temperature: 40° C.
Reached temperature: 200° C.
Measurement interval: 1.0° C.
Cross-sectional area of piston: 1.000 cm$^2$
Test load (piston load): 10.0 kgf/cm$^2$ (0.9807 MPa)
Preheat time: 300 sec
Die hole diameter: 1.0 mm
Die length: 1.0 mm Method for Measuring Number Average Particle Diameter (D1) of Primary Particles of Silica Fine Particles The number-average particle diameter of the primary particles of silica fine particles was calculated from a silica fine particle image of the toner surface taken by a Hitachi ultra-high resolution field emission scanning electron microscope.

Specifically, a model S-4800 (trade name) (Hitachi High-Technologies Corporation) was used as the Hitachi ultra-high resolution field emission scanning electron microscope. The image capturing conditions of S-4800 are as follows.

(1) Sample Preparation

A thin layer of conductive paste is coated on a sample stand (aluminum sample stand 15 mm×6 mm), and a toner is sprayed thereon. Further, air blowing is performed to remove excess toner from the sample table and dry the sample table sufficiently. The sample table is set on the sample holder, and the sample table height is adjusted to 36 mm by a sample height gauge.

(2) Setting Observation Conditions in S-4800

The number-average particle diameter of the primary particles of silica fine particles was calculated using the image obtained by observation of the backscattered electron image of S-4800. Since the backscattered electron image has less charge-up than the secondary electron image, the particle diameter can be accurately measured.

Liquid nitrogen was injected into an anti-contamination trap attached to the housing of S-4800 until the nitrogen overflowed, and the device was allowed to stand for 30 min A "PCSTEM" of S-4800 was started up and flushing (cleaning of the FE chip which is the electron source) was performed. An accelerating voltage display area on a control panel on a screen was clicked, and a [FLUSHING] button was pushed to open a flushing execution dialog. It was confirmed that the flushing strength was 2 and flushing was executed. It was confirmed that the emission current due to flushing was from 20 μA to 40 μA. The sample holder was inserted into the sample chamber of the S-4800 housing. [ORIGIN] on the control panel was pushed to move the sample holder to the observation position.

The accelerating voltage display was clicked to open an HV setting dialog, the accelerating voltage was set to [0.8 kV] and the emission current was set to [20 μA]. In the [BASIC] tab of the operation panel, the signal selection was set to [SE], [Up (U)] and [+BSE] were selected for an SE detector, [L. A. 100] was selected in a selection box to the right of [+BSE], and the observation mode was set to a backscattered electron image. Similarly, in the [BASIC] tab of the operation panel, a probe current of an electron optical system condition block was set to [Normal], the focus mode was set to [UHR], and WD was set to [3.0 mm]. An [ON] button on the acceleration voltage display section of the control panel was pushed and the acceleration voltage was applied.

(3) Calculation of Number Average Particle Diameter (D1) of Primary Particles of Silica Fine Particles The magnification was set to 100,000 (100k) times by dragging in a magnification display section of the control panel. A focus knob [COARSE] on the operation panel was rotated to adjust the aperture alignment when the focus was adjusted to some extent. [Align] on the control panel was clicked to display an alignment dialog and [BEAM] was selected. STIGMA/ALIGNMENT knobs (X, Y) on the operation panel were rotated to move the displayed beam to the center of the concentric circles. Next, [APERTURE] was selected, and the STIGMA/ALIGNMENT knob (X, Y) were turned one by one so that the movement of the image was stopped or the movement was minimized. The aperture dialog was closed and focusing was performed with auto focus. This operation was repeated twice more to focus.

After that, the maximum diameter was measured for at least 300 silica fine particles on the toner surface, and the average value was obtained. Here, some silica fine particles are present as aggregates. Therefore, the maximum diameter of what can be confirmed as primary particles was obtained, and the obtained maximum diameter was arithmetically averaged. Thereby, the number-average particle diameter (D1) of the a primary particle of the silica fine particle was obtained.

Method for Measuring Fixing Rate of Silica Fine Particles

A total of 20 g of "Contaminon N" (10% by mass aqueous solution of a neutral detergent for cleaning precision measuring instruments which is composed of a nonionic surfactant, an anionic surfactant, and an organic builder and has pH 7) was weighed in a 50 mL capacity vial, and 1 g of toner was mixed.

The vial was set in "KM Shaker" (model: V. SX) manufactured by Iwaki Sangyo Co., Ltd., and shaken for 30 sec at a speed set to 50. As a result, the silica fine particles migrated from the toner particle surface to the dispersion liquid side according to the sticking state of the silica fine particles.

After that, in the case of a magnetic toner, a neodymium magnet was used to restrain the toner particles, the silica fine particles migrated to the supernatant liquid were separated, and the precipitated toner was dried by vacuum drying (40° C./24 h) to obtain a sample.

In the case of a non-magnetic toner, a centrifugal separator (H-9R; manufactured by Kokusan Co., Ltd.) (1,000 rpm for 5 min) was used to separate the toner and the silica fine particles migrated to the supernatant liquid.

The toner was pelletized by the following press molding to obtain a sample.

In the toner samples before and after the above treatment, the elements specific to the fine particles to be analyzed were quantified by wavelength dispersive fluorescent X-ray analysis (XRF) described hereinbelow. Then, the amount of the fine particles that did not migrate to the supernatant side in the above treatment and remained on the toner surface was determined from the following formula and taken as a fixing rate.

Apparatus Used and Measurement Conditions

Wavelength dispersive X-ray fluorescence analyzer 3080 (Rigaku Denki Co., Ltd.)

Sample Preparation

For sample preparation, a sample press molding machine MAEKAWA Testing Machine (MFG Co., LTD.) was used. A total of 0.5 g of toner was put into an aluminum ring (model number: 3481E1), a load of 5.0 ton was set, and the product was pressed for 1 min and pelletized.

(Measurement conditions)

Measurement diameter: 10φ

Measurement potential, voltage: 50 kV, 50 mA to 70 mA

2θ angle: 25.12°

Crystal plate: LiF

Measurement time: 60 sec

Method for Calculating Fixing Rate of Silica Fine Particles

Fixing rate of silica fine particles (%)=(Intensity of element of toner after treatment derived from silica fine particles)/(Intensity of element of toner before treatment derived from silica fine particles)×100 [Formula]

An arithmetic mean value of 100 samples was adopted.

Method for Measuring Volume Resistivity of Silica Fine Particles

A method for measuring the volume resistivity of silica fine particles is described hereinbelow.

First, a cell was filled with silica fine particles, one and the other of a pair of electrodes were arranged so as to be in contact with the filled silica fine particles, a voltage was applied between these electrodes, and the current flowing at that time was measured. The measurement conditions of the volume resistivity were as follows: the contact area between the filled silica fine particles and the electrode was 0.283 cm$^2$, the filling thickness was about 1.0 mm, the load on the upper electrode was 120 g/cm$^2$, and the applied voltage was 500 V.

TABLE 9

| Toner No. | 101 | 102 | 103 | 104 | 105 | 106 | 107 | 108 | 201 |
|---|---|---|---|---|---|---|---|---|---|
| Toner particle No. | 101 | 101 | 101 | 101 | 101 | 102 | 102 | 102 | 101 |
| Silica fine particle No. | 101 | 102 | 102 | 102 | 103 | 103 | 104 | 105 | 101 |
| Parts by mass | 2.0 | 2.5 | 2.5 | 2.0 | 2.5 | 2.5 | 2.5 | 2.5 | 0.8 |
| Rotation speed of Henschel mixer (rpm) | 3600 | 3600 | 4600 | 3600 | 4600 | 4600 | 4600 | 4600 | 3600 |
| Mixing time of Henschel mixer (min) | 30 | 30 | 50 | 5 | 50 | 50 | 50 | 50 | 30 |
| Coverage ratio (% by area) | 70.0 | 73.0 | 70.0 | 75.0 | 70.0 | 70.0 | 70.0 | 70.0 | 30.0 |
| Fixing rate (%) | 55.0 | 53.0 | 95.0 | 30.0 | 95.0 | 95.0 | 95.0 | 95.0 | 65.0 |

Example 1

The conductive member 101 and the toner 101 were evaluated in the following manner. The evaluation results are shown in Table 10.

Image Density Uniformity of Halftone Image (Evaluation 1)

HP LaserJet Enterprise M609dn (manufactured by HP Co.) was modified to a speed of 400 mm/s which is faster than the original process speed.

A predetermined process cartridge (product name: 37Y black toner cartridge, manufactured by HP Co.) filled with 1,500 g of toner 101 was prepared. An image output test of 100,000 prints was performed in a mode that was set so that the machine was temporarily stopped between jobs and then the next job was started, one job being two prints of a horizontal line pattern with a print percentage of 1%.

After the evaluation of the 50,000th sheet, the photosensitive drum was replaced with a new one, 1,500 g of the toner 101 was filled, and the evaluation was continued. The evaluation was performed in a low-temperature and low-humidity environment (15.0° C., 10% RH).

On the 50,000th sheet and the 100,000th sheet, a check image having a solid image portion of 20 mm×20 mm and a halftone image portion of 200 mm×250 mm (dot print percentage of 23%) was outputted after a leading edge margin of 5 mm.

Then, the image density of the halftone image part was measured at 10 randomly selected points, the maximum value and the minimum value were determined, and the difference between the maximum value and the minimum value was determined (halftone image density difference).

The image density was measured by measuring the reflection density of the image area using an SPI filter with a Macbeth densitometer (manufactured by Macbeth Co.), which is a reflection densitometer.

The smaller the halftone density difference, the more excellent the uniformity of the halftone image.

The specific evaluation criteria are shown below.
A: Concentration difference is less than 0.04.
B: Concentration difference is at least 0.04 and less than 0.07.
C: Concentration difference is at least 0.07 and less than 0.10.
D: Concentration difference is at least 0.10.

Image Density of Halftone Image (Evaluation 2)

In the image density uniformity test of the halftone image, in the 50,000th and 100,000th check images, the image density of the halftone image portion was measured at 10 randomly selected points, and the average value was obtained (halftone image density).

The image density was measured by measuring the reflection density of the image area using a SPI filter with a Macbeth densitometer (manufactured by Macbeth Co.), which is a reflection densitometer.

The higher the halftone image density, the better the durability of the toner. The specific evaluation criteria are shown below.
A: Image density is at least 0.70.
B: Image density is at least 0.65 and less than 0.70.
C: Image density is at least 0.60 and less than 0.65.
D: Image density is less than 0.60.

Evaluation of Fogging on Non-image Portion (Evaluation 3)

In Evaluation 2, after outputting the check images on the 50,000th sheet and the 100,000th sheet, 5 sheets with a white background image were outputted, and the fogging rate was measured for each sheet to obtain the maximum value that was taken as the fogging rate after endurance. The fogging rate after the durability test was measured in the following manner.

Using a digital white photometer (TC-6D type, Tokyo Denshoku Co., Ltd., using a green filter) for an evaluation image and white paper before passing, the reflectance (%) was measured at 5 points per sheet, and the average reflectance (%) was determined. The difference between the average reflectance (%) of the white paper and the average reflectance (%) of the evaluation image was taken as the fogging rate (%).

Bond paper (basis weight 75 g/m$^2$) was used as the evaluation paper.
A: Fogging rate is less than 0.5%.
B: Fogging rate is at least 0.5% and less than 1.0%.
C: Fogging rate is at least 1.0% and less than 1.5%.
D: Fogging rate is at least 1.5%.

Evaluation of Image Roughness (Evaluation 4)

The evaluation of image roughness was performed using the 100,000th check image in Evaluation 2 above. The area of 1,000 dots of the check image was measured using a digital microscope VI-DC-500 (lens wide range zoom lens VH-Z100 manufactured by Keyence Corporation).

The number average (S) of dot areas and the standard deviation ($\sigma$) of dot areas were calculated, and the dot reproducibility index was calculated by the following formula.

Then, the roughness of the halftone image was evaluated by the dot reproducibility index (I).

The smaller the dot reproducibility index (I), the better the dot reproducibility.

$$\text{Dot reproducibility index }(I)=\sigma/S\times 100$$

A: I is less than 2.0.
B: I is at least 2.0 and less than 4.0.
C: I is at least 4.0 and less than 6.0.
D: I is at least 6.0 and less than 8.0.
E: I is at least 8.0.

Evaluation of Fusion to Regulating Member (Evaluation 5)

In the 100,000th check image of Evaluation 2 above, the amounts of spot-shaped streaks and toner lumps appearing on the image were evaluated according to the following criteria.
A: Not generated.
B: There are no spot-shaped streaks, but there are 2 or 3 small toner lumps.
C: There are some spot-shaped streaks at the ends, or there are 4 or 5 small toner lumps.
D: There are spot-shaped streaks over the entire surface, or at least 5 small toner lumps, or there is an easily noticeable toner lump.

Examples 2 to 19 and Comparative Examples 1 to 4

The same evaluation as in Example 1 was performed except that the toner and the conductive member were changed as shown in Tables 10 to 12. The evaluation results are shown in Tables 10 to 12.

TABLE 10

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Toner No. | 101 | 101 | 101 | 101 | 101 | 101 | 101 | 101 | 101 | 101 |
| Conductive member No. | 101 | 102 | 103 | 104 | 105 | 106 | 107 | 108 | 109 | 110 |

TABLE 10-continued

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Evaluation 1 | 50,000th sheet | A 0.02 | A 0.03 | B 0.05 | A 0.03 | B 0.06 | B 0.06 | B 0.06 | A 0.03 | A 0.03 | A 0.03 |
|  | 100,000th sheet | A 0.02 | A 0.03 | B 0.05 | A 0.03 | B 0.06 | B 0.06 | B 0.06 | B 0.06 | B 0.06 | A 0.03 |
| Evaluation 2 | 50,000th sheet | A 0.73 | A 0.73 | B 0.69 | A 0.73 | B 0.68 | B 0.68 | A 0.73 | A 0.71 | A 0.70 | A 0.71 |
|  | 100,000th sheet | A 0.70 | A 0.70 | B 0.67 | A 0.70 | B 0.67 | B 0.67 | A 0.73 | B 0.65 | B 0.65 | A 0.70 |
| Evaluation 3 | 50,000th sheet | A 0.3 | B 0.5 | B 0.5 | B 0.5 | B 0.5 | B 0.5 | B 0.5 | B 0.5 | B 0.5 | A 0.3 |
|  | 100,000th sheet | A 0.4 | B 0.7 | B 0.7 | B 0.7 | B 0.7 | B 0.7 | B 0.7 | B 0.7 | B 0.7 | A 0.4 |
| Evaluation 4 |  | A 1.7 | A 1.9 | B 2.5 | B 3.2 | B 3.6 | B 3.9 | C 4.3 | A 1.9 | A 1.8 | C 4.3 |
| Evaluation 5 |  | A | A | A | A | A | A | A | A | A | A |

TABLE 11

|  |  | Example |  |  |  |  |  |  |  |
|---|---|---|---|---|---|---|---|---|---|
|  |  | 11 | 12 | 13 | 14 | 15 | 16 | 17 | 18 |
| Toner No. |  | 101 | 102 | 103 | 104 | 105 | 106 | 107 | 108 |
| Conductive member No. |  | 111 | 101 | 101 | 101 | 101 | 101 | 101 | 101 |
| Evaluation 1 | 50,000th sheet | A 0.03 | B 0.06 | C 0.08 | A 0.03 | A 0.03 | A 0.03 | A 0.03 | A 0.03 |
|  | 100,000th sheet | A 0.03 | B 0.06 | C 0.08 | B 0.05 | B 0.05 | B 0.05 | B 0.05 | B 0.05 |
| Evaluation 2 | 50,000th sheet | A 0.71 | A 0.72 | A 0.72 | B 0.66 | A 0.71 | B 0.69 | B 0.68 | B 0.67 |
|  | 100,000th sheet | A 0.70 | A 0.72 | A 0.72 | C 0.61 | B 0.68 | C 0.64 | C 0.63 | C 0.62 |
| Evaluation 3 | 50,000th sheet | A 0.3 | A 0.3 | A 0.3 | B 0.8 | A 0.3 | A 0.2 | B 0.5 | A 0.4 |
|  | 100,000th sheet | A 0.4 | A 0.4 | A 0.4 | B 0.9 | A 0.4 | A 0.4 | B 0.8 | C 1.0 |
| Evaluation 4 |  | C 4.1 | A 1.9 | A 1.6 | A 1.7 | A 1.7 | A 1.7 | A 1.5 | A 1.7 |
| Evaluation 5 |  | A | A | A | C | A | B | B | B |

TABLE 12

|  |  | Comparative example |  |  |  |
|---|---|---|---|---|---|
|  |  | 1 | 2 | 3 | 4 |
| Toner No. |  | 101 | 101 | 101 | 201 |
| Comparative example No. |  | 201 | 202 | 203 | 201 |
| Evaluation 1 | 50,000th sheet | D 0.12 | D 0.12 | C 0.08 | D 0.12 |
|  | 100,000th sheet | D 0.13 | D 0.13 | C 0.09 | D 0.15 |
| Evaluation 2 | 50,000th sheet | C 0.63 | C 0.64 | D 0.58 | D 0.58 |
|  | 100,000th sheet | C 0.61 | C 0.61 | D 0.55 | D 0.52 |
| Evaluation 3 | 50,000th sheet | C 1.0 | C 1.0 | D 1.6 | D 1.6 |
|  | 100,000th sheet | C 1.2 | C 1.2 | D 1.9 | D 2.2 |
| Evaluation 4 |  | C 5.3 | E 8.9 | C 5.8 | C 4.1 |
| Evaluation 5 |  | C | C | C | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-191592, filed Oct. 18, 2019 which is hereby incorporated by reference herein in its entirety.

What is claimed is:

1. An electrophotographic apparatus comprising:
an electrophotographic photosensitive member;
a charging device for charging a surface of the electrophotographic photosensitive member; and
a developing device for developing an electrostatic latent image formed on the surface of the electrophotographic photosensitive member with a toner to form a toner image on the surface of the electrophotographic photosensitive member, wherein
the charging device comprises a conductive member arranged to be capable of contacting the electrophotographic photosensitive member,
the conductive member comprises a support having a conductive outer surface, and a conductive layer provided on the outer surface of the support,
the conductive layer comprises a matrix and a plurality of domains dispersed in the matrix, the matrix contains a first rubber, each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy.

2. The electrophotographic apparatus according to claim 1, wherein the domains form protruded portions on the outer surface of the conductive member.

3. The electrophotographic apparatus according to claim 1, wherein an arithmetic mean value Dms of distances between adjacent wall surfaces of the domains in the conductive layer when observing the outer surface of the conductive member is from 0.20 to 6.00 μm.

4. The electrophotographic apparatus according to claim 1, wherein an arithmetic mean value Dm of distances between adjacent wall surfaces of the domains in the conductive layer in cross-sectional observation of the conductive member is from 0.20 to 6.00 μm.

5. The electrophotographic apparatus according to claim 1, wherein an arithmetic mean value D of circle-equivalent diameters of the domains in the conductive layer in cross-sectional observation of the conductive member is from 0.10 to 5.00 μm.

6. The electrophotographic apparatus according to claim 1, wherein a number-average particle diameter of a primary particle of the silica fine particle is from 5 to 25 nm.

7. The electrophotographic apparatus according to claim 1, wherein a fixing rate of the silica fine particle to the surface of the toner particle is from 40.0 to 90.0%.

8. The electrophotographic apparatus according to claim 1, wherein a volume resistivity of the silica fine particle is from $1.00 \times 10^{12}$ Ω·cm to $1.00 \times 10^{17}$ Ω·cm under a condition of an electric field strength of 5,000 V/cm.

9. A process cartridge that is detachably attachable to a main body of an electrophotographic apparatus, the process cartridge comprising:

a charging device for charging a surface of an electrophotographic photosensitive member; and a developing device for developing an electrostatic latent image formed on the surface of the electrophotographic photosensitive member with a toner to form a toner image on the surface of the electrophotographic photosensitive member, wherein the charging device comprises a conductive member arranged to be capable of contacting the electrophotographic photosensitive member, the conductive member comprises a support having a conductive outer surface, and a conductive layer provided on the outer surface of the support, the conductive layer comprises a matrix and a plurality of domains dispersed in the matrix, the matrix contains a first rubber, each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the developing device comprises the toner, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy.

10. A cartridge set that is detachably attachable to a main body of an electrophotographic apparatus and comprises a first cartridge and a second cartridge, wherein the first cartridge comprises a charging device for charging a surface of an electrophotographic photosensitive member, and a first frame for supporting the charging device, the second cartridge comprises a toner container that accommodates a toner for developing an electrostatic latent image formed on the surface of the electrophotographic photosensitive member to form a toner image on the surface of the electrophotographic photosensitive member, the charging device comprises a conductive member arranged to be capable of contacting the electrophotographic photosensitive member;

the conductive member comprises a support having a conductive outer surface, and a conductive layer provided on the outer surface of the support, the conductive layer comprises a matrix and a plurality of domains dispersed in the matrix, the matrix contains a first rubber;

each of the domains contains a second rubber and an electronic conductive agent, at least some of the domains are exposed at the outer surface of the conductive member, the outer surface of the conductive member is composed of at least the matrix and the domains exposed at the outer surface of the conductive member, the matrix has a volume resistivity R1 of larger than $1.00 \times 10^{12}$ Ω·cm, the volume resistivity R1 of the matrix is $1.0 \times 10^5$ times or more a volume resistivity R2 of the domains, the toner comprises a toner particle containing a binder resin, and a silica fine particle on a surface of the toner particle, and a coverage ratio of the toner surface with the silica fine particles is from 62.0% by area to 100.0% by area as determined by X-ray photoelectron spectroscopy.

* * * * *